US008745248B2

(12) United States Patent
Yamaguchi

(10) Patent No.: US 8,745,248 B2
(45) Date of Patent: Jun. 3, 2014

(54) COMMUNICATION APPARATUS, COMPUTER-READABLE STORAGE MEDIUM HAVING STORED THEREIN COMMUNICATION CONTROL PROGRAM, COMMUNICATION CONTROL METHOD, AND COMMUNICATION SYSTEM FOR DECREASED CONNECTION TIME TO AN ACCESS POINT

(75) Inventor: Takahiro Yamaguchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 758 days.

(21) Appl. No.: 12/791,214

(22) Filed: Jun. 1, 2010

(65) Prior Publication Data

US 2011/0231559 A1      Sep. 22, 2011

(30) Foreign Application Priority Data

Mar. 17, 2010    (JP) ................................ 2010-061511

(51) Int. Cl.
*G06F 15/16* (2006.01)
*H04W 48/20* (2009.01)

(52) U.S. Cl.
CPC ..................................... *H04W 48/20* (2013.01)
USPC ........... 709/228; 709/227; 709/229; 455/500; 455/507

(58) Field of Classification Search
CPC .................................................. H04W 48/20
USPC .......................... 709/227–229; 455/500, 507
See application file for complete search history.

(56) References Cited

U.S. PATENT DOCUMENTS

| 6,842,460 B1* | 1/2005 | Olkkonen et al. ............ 370/465 |
| 7,974,574 B2* | 7/2011 | Shen et al. .................... 455/11.1 |
| 2003/0002456 A1* | 1/2003 | Soomro et al. ............... 370/328 |
| 2004/0110530 A1 | 6/2004 | Alone et al. |
| 2007/0248058 A1* | 10/2007 | Fajardo et al. ............... 370/338 |
| 2008/0148359 A1* | 6/2008 | Kezys et al. ...................... 726/4 |
| 2009/0029728 A1* | 1/2009 | Shen et al. .................... 455/507 |
| 2011/0231559 A1* | 9/2011 | Yamaguchi ................... 709/228 |
| 2013/0089028 A1* | 4/2013 | Lee et al. ...................... 370/328 |

FOREIGN PATENT DOCUMENTS

| JP | 2004-140778 | 5/2004 |
| JP | 2007-060566 | 3/2007 |
| JP | 2007-104417 | 4/2007 |

OTHER PUBLICATIONS

"802.11 High-Speed Wireless LAN Textbook (Revised Edition)", edited by Masahiro Morikura and Shuji Kubota, Impress, (Dec. 2004), pp. 105-106.

* cited by examiner

*Primary Examiner* — Mohamed Wasel
(74) *Attorney, Agent, or Firm* — Nixon & Vanderhye, P.C.

(57) ABSTRACT

A first determination section determines, when an instruction for connection establishment is issued, whether or not connection information including target apparatus specifying information that uniquely specifies a predetermined target apparatus is stored in a first storage section. A first connection section performs, when the first determination section determines that the connection information is stored in the first storage section, a process for establishing a connection by wireless communication to the target apparatus that is specified based on the target apparatus specifying information stored in the first storage section.

23 Claims, 16 Drawing Sheets

COMMUNICATION APPARATUS, COMPUTER-READABLE STORAGE MEDIUM HAVING STORED THEREIN COMMUNICATION CONTROL PROGRAM, COMMUNICATION CONTROL METHOD, AND COMMUNICATION SYSTEM FOR DECREASED CONNECTION TIME TO AN ACCESS POINT

CROSS REFERENCE TO RELATED APPLICATION

The disclosure of Japanese Patent Application No. 2010-61511, filed on Mar. 17, 2010, is incorporated herein by reference.

BACKGROUND OF THE INVENTION

1. Field of the Invention

The present invention relates to a communication apparatus which performs wireless communication with a target apparatus, a computer-readable storage medium having stored therein a control program thereof, and a control method thereof. More particularly, the invention relates to a control process and a control method relating to establishment of a connection with the target apparatus.

2. Description of the Background Art

In recent years, communication using a wireless LAN such as the IEEE 802.11 standard has become widespread among terminals such as notebook PCs, hand-held game machines, and the like. Such communication requires a function of searching for another station such as an access point of a connection target, another terminal, or the like. Generally, a client terminal such as a notebook PC or a hand-held game machine has the same ESSID (Extended Service Set Identifier) as that of a connection target, and searches for a connection target station having the same ESSID by performing passive scan or active scan which are described in, for example, "802.11 High-Speed Wireless LAN Textbook (Revised Edition)" edited by Masahiro Morikura and Shuji Kubota, Impress, December 2004, p. 105-106.

The passive scan is performed as follows. A client terminal monitors (searches for) a signal (beacon) transmitted from other stations, with respect to each frequency band (channel) used in a wireless LAN. This signal is broadcasted from each station at regular intervals, and includes an ESSID, and a BSSID (Basic Service Set Identifier) which is an identifier specific to a station. Usually, the BSSID is identical to a MAC address of a station. The client terminal having received this signal determines whether or not an ESSID set in the client terminal matches the ESSID included in the signal. When there is a match, the client terminal transmits a connection request with the BSSID included in the signal being a destination, by using the channel through which the client terminal received the signal, thereby establishing a connection with the station which transmitted the signal.

On the other hand, the active scan is performed as follows. A client terminal broadcasts, through each channel, a signal (probe request) including an ESSID set in the client terminal, and thereafter, waits for a response from another station in each channel. Each station having received the signal determines whether or not the ESSID included in the signal matches an ESSID set in the station. When there is a match, the station transmits a signal (probe response) including its own BSSID to the client terminal. The client terminal having received this signal transmits, using the channel through which the client terminal received the signal, a connection request with the BSSID included in the probe response as the destination, thereby establishing a connection with the station which transmitted the probe response.

In the aforementioned connection establishing methods, however, even when searching for a station is performed using either the passive scan or the active scan, the terminal requires a time for waiting for a signal from each station in each channel, and thus the terminal might take a lot of time to establish connection. For example, assuming that the client terminal waits for beacons or probe responses from other stations with respect to eleven channels, and requires a waiting time of at least 100 ms for each channel, the terminal requires about 1.1 sec until it completes the scan to obtain information required for connection. If a process such as a retry is included, more time is required. Such scanning method is useful when applied to a communication environment such as a public wireless LAN service in which different APs (access points) have the same ESSID but different BSSIDs and different communication channels. However, in a case where a terminal is always connected to the same access point installed at home (on a home network) or the like, the BSSID and the used channel of the connection target are not likely to be changed, and it is not likely to be necessary to scan all the eleven channels as described above. Therefore, for a user who usually connects a terminal to an access point installed at home, the aforementioned waiting time causes the user to feel stress.

SUMMARY OF THE INVENTION

Therefore, an object of the present invention is to provide a communication apparatus capable of reducing the time required for establishing a connection with a target apparatus in a wireless communication, a computer-readable storage medium having stored therein a control program thereof, and a control method thereof.

The present invention has the following features to attain the object mentioned above.

A first aspect of the present invention is directed to a communication apparatus which performs a wireless communication with a target apparatus, and includes a first storage section, a first determination section, and a first connection section. When an instruction for connection establishment is issued, the first determination section determines whether or not connection information, which includes target apparatus specifying information that uniquely specifies a predetermined target apparatus, is stored in the first storage section. When the first determination section determines that the connection information is stored in the first storage section, the first connection section performs a process for establishing a connection, by wireless communication, to the target apparatus that is specified based on the target apparatus specifying information stored in the first storage section.

Thus, according to the first aspect, the time required for establishing a connection between the communication apparatus and the target apparatus can be reduced.

In a second aspect based on the first aspect, the communication apparatus further includes a searching section, a second connection section, and a connection information storage section. When the instruction for connection establishment is issued, the searching section searches for a connectable target apparatus, and receives a signal including the connection information. As a searching method, for example, so-called active scan and passive scan may be adopted. The second connection section performs a process for establishing a connection to the target apparatus searched for by the searching section, using the connection information included in the received signal. When a connection has been established by the second connection section, the connection information storage section stores the connection information used for the connection in the first storage section. When the instruction for connection establishment is issued, if a result of the determination by the first determination section indicates that the connection information is stored in the first storage section, the first connection section performs the connection establishing process, and if the result of the determination indicates that the connection information is not stored in the first storage section, the searching section and the second connection section perform the connection establishing process.

Thus, according to the second aspect, when the connection information is not stored in the first storage section, a connectable target apparatus is searched for, and connection information thereof is stored. Therefore, the time required for the subsequent process of establishing a connection to the target apparatus can be reduced.

In a third aspect based on the second aspect, the communication apparatus further includes a connection result determination section for determining whether the first connection section has succeeded or failed in connection establishment. When the instruction for connection establishment is issued, the first connection section performs the connection establishing process, and if the connection result determination section determines that the first connection section has failed in connection establishment, the searching section and the second connection section perform the connection establishing process. Further, when the second connection section has succeeded in connection establishment which has been performed when the first connection section has failed in connection establishment, the connection information storage section stores the connection information used for the successful connection.

Thus, according to the third aspect, even when the connection establishment using the stored connection information has failed, connection information is newly received and stored. Therefore, the reliability of connection can be enhanced.

In a fourth aspect based on the second aspect, the connection information storage section continues to hold the connection information stored in the first storage section when the second connection section has succeeded in connection establishment, after the established connection was disconnected.

Thus, according to the fourth aspect, the connection information obtained when the second connection section has established a connection is held in the first storage section even after the established connection was disconnected. Therefore, when the first connection section attempts to establish a connection to the same target apparatus, a speedy connection can be realized.

In a fifth aspect based on the second aspect, the searching section searches for a target apparatus by scanning an available frequency band.

Thus, according to the fifth aspect, the available frequency band is scanned. Therefore, a target device can be searched for with enhanced reliability.

In a sixth aspect based on the first aspect, the target apparatus specifying information is a BSSID.

Thus, according to the sixth aspect, a target apparatus can be easily specified.

In a seventh aspect based on the first aspect, the first storage section stores a plurality of pieces of connection information corresponding to a plurality of target apparatuses, respectively. The communication apparatus further includes a connection result determination section for determining whether or not the first connection section has succeeded or failed in the connection establishment, and a priority setting section for setting connection priorities to the plurality of target apparatuses, in association with the plurality of pieces of connection information. The first determination section determines whether or not connection information of a target apparatus having a highest connection priority is stored in the first storage section. When it is determined that the connection information of the target apparatus having the highest connection priority is stored in the first storage section, the first connection section attempts to establish a connection to the target apparatus having the highest connection priority. If the connection result determination section determines that the first connection section has failed in establishing a connection to the target apparatus having the highest connection priority, the first determination section determines whether or not connection information of a target apparatus having a second highest connection priority is stored in the first storage section.

In an eighth aspect based on the first aspect, the first storage section stores a plurality of pieces of connection information corresponding to a plurality of target apparatuses, respectively. The communication apparatus further includes a priority setting section for setting connection priorities to the plurality of target apparatuses, in association with the plurality of pieces of connection information. Further, the first determination section determines whether or not connection information of a target apparatus having a highest connection priority is stored in the first storage section. When it is determined that the connection information of a target apparatus having a highest connection priority is not stored in the first storage section, the first determination section determines whether or not connection information of a target apparatus having a second highest connection priority is stored in the first storage section.

Thus, according to the seventh and eighth aspects, when a connection to a target apparatus having the highest connection priority has failed or when connection information of a target apparatus having the highest connection priority is not stored, it is confirmed whether or not connection information of a target apparatus having the second highest connection priority exists. Therefore, when a plurality of target apparatuses are set, the time required for establishing a connection with any of the target apparatuses can be reduced.

In a ninth aspect based on the seventh aspect, the communication apparatus further includes a priority order changing section for changing the order of the connection priorities given to the plurality of target apparatuses.

Thus, to the ninth aspect, the connection priorities can be appropriately set according to the connection status (e.g., connection frequency) with each of the plural target apparatuses.

In a tenth aspect based on the second aspect, the first storage section stores a plurality of pieces of connection information corresponding to a plurality of target apparatuses, respectively. The communication apparatus further includes a priority setting section for setting connection priorities to the plurality of target apparatuses, in association with the plurality of pieces of connection information. The first determination section determines whether or not connection information of a target apparatus having a highest priority is stored in the first storage section. When the first determination section determines that the connection information of a target apparatus having a highest priority is not stored in the first storage section, the searching section searches for the target apparatus having the highest connection priority, and receives a signal including the connection information of the target apparatus having the highest priority. The second connection section performs a process for establishing a connection to the target apparatus having the highest priority searched for by the searching section.

Thus, according to the tenth aspect, when connection information of a target apparatus having the highest connection priority is not stored, connection information (identification information) of the target apparatus having the highest connection priority is searched for and obtained. That is, for example, when connection information of a target apparatus having the first priority is not stored, the searching section searches for the target apparatus having the first priority before a connection to a target apparatus having the second priority is attempted. Therefore, the connection establishing process can be performed faithfully according to the set connection priorities.

In an eleventh aspect based on the second aspect, the connection information storage section includes in the connection information, frequency band information indicating a frequency band used when a connection is established by the second connection section, and stores the connection information in the first storage section. Further, the first connection section performs a process for establishing a connection to the target apparatus specified based on the target apparatus specifying information, by using the frequency band indicated by the stored frequency band information.

Thus, according to the eleventh aspect, when performing a communication using a part (typically, a wireless channel) of a frequency band that is assigned to a wireless communication of a predetermined standard, if a connection has been established, a subsequent connection establishing process can be started under the state where the frequency band to be used has already been specified. Therefore, the time required for connection establishment can be reduced as compared with the case where the entire frequency band is scanned every time connection establishment is attempted, to search for apart of the frequency band to be used for the communication.

In a twelfth aspect based on the eleventh aspect, the searching section receives a signal including at least the target apparatus specifying information and network identifying information which is identification information relating to a network to which the target apparatus belongs and is different from the target apparatus specifying information. The communication apparatus further includes a second storage section and a second determination section. The second storage section stores the network identifying information. The second determination section determines whether or not the network identifying information included in the signal received by the searching section matches the network identifying information stored in the second storage section. When a result of the determination by the second determination section indicates that the network identifying information included in the signal received by the searching section matches the network identifying information stored in the second storage section, the second connection section performs the connection establishing process with specifying the frequency band used when the searching section has received the signal, and specifying, as a destination of connection, the target apparatus indicated by the target apparatus specifying information included in the signal.

Thus, according to the twelfth aspect, target apparatuses having the same network identifying information e.g., ESSID) are specified as connection targets. Therefore, searching for a target apparatus can be performed with enhanced efficiency.

In a thirteenth aspect based on the twelfth aspect, the first storage section stores a plurality of pieces of connection information corresponding to a plurality of target apparatuses, respectively. The communication apparatus further includes a priority setting section for setting connection priorities to the plurality of target apparatuses, in association with the plurality of pieces of connection information. The first determination section determines whether or not connection information of a target apparatus having a highest connection priority is stored in the first storage section. When the first determination section determines that the connection information of the target apparatus having the highest connection priority is not stored in the first storage section, the searching section receives a signal which is periodically transmitted from the predetermined target apparatus and includes the network information and the target apparatus specifying information. The second determination section determines whether or not the network identifying information included in the signal received by the searching section matches the network identifying information of the target apparatus having the highest connection priority, which is stored in the second storage section. When the second determination section determines that the network identifying information included in the signal matches the network identifying information stored in the second storage section, the second connection section performs a connection establishing process in which the target apparatus indicated by the target apparatus specifying information included in the signal received by the searching section is specified as a destination of connection. When the second connection section has established a connection, the connection information storage section stores, in the first storage section, the connection target specifying information included in the signal received by the searching section, and the frequency band information indicating the frequency band used for the connection, as the connection information relating to the target apparatus with which the connection has been established.

Thus, according to the thirteenth aspect, the same effect as that of the tenth aspect can be achieved.

In a fourteenth aspect based on the thirteenth aspect, when the second connection section has failed in connection establishment, the second determination section determines whether or not network identifying information corresponding to a target apparatus having a second highest priority, among the pieces of network identifying information stored in the second storage section, matches the network identifying information included in the received signal.

Thus, according to the fourteenth aspect, when a plurality of pieces of connection information, which are given with priorities, are stored in the communication apparatus, and a connection to a target apparatus having the highest priority has failed, the communication apparatus can attempt to establish a connection to a target apparatus having the second highest priority. Therefore, the terminal apparatus can attempt to establish a connection to a target apparatus with efficiency according to the connection priorities.

In a fifteenth aspect based on the thirteenth aspect, when the second determination section determines that the network identifying information corresponding to the target apparatus having the highest priority, among the pieces of network identifying information stored in the second storage section, does not match the network identifying information included in the received signal, the second determination section determines whether or not network identifying information corresponding to a target apparatus having a second highest connection priority is included in the pieces of network identifying information stored in the second storage section.

Thus, according to the fifteenth aspect, the communication apparatus attempts to establish a connection to a target apparatus, with efficiency, according to the connection priorities.

In a sixteenth aspect based on the first aspect, the connection information includes frequency band information indicating a frequency band used for performing wireless communication with the target apparatus. The communication apparatus further includes a synchronization section for searching for the target apparatus with specifying the frequency band indicated by the frequency band information stored in the first storage section, receiving a signal including information for time synchronization from the target apparatus, and performing time synchronization with the target apparatus, based on the information for time synchronization.

In a seventeenth aspect based on the sixteenth aspect, immediately before the first connection section starts to perform connection establishment, the synchronization section searches for the target apparatus with specifying the frequency band, and performs the time synchronization.

Thus, according to the sixteenth and seventeenth aspects, the reliability of connection with a target apparatus can be enhanced.

In an eighteenth aspect based on the sixteenth aspect, the communication apparatus further includes a third storage section and a synchronization determination section. The third storage section stores information indicating whether or not time synchronization has been performed by the synchronization section. The synchronization determination section determines, before the first connection section starts to perform connection establishment, whether or not time synchronization has been performed, with reference to the information that is stored in the third storage section and indicates whether or not time synchronization has been performed. When the synchronization determination section determines that time synchronization has not yet been performed, the synchronization section searches for the target apparatus with specifying the frequency band, performs time synchronization, and stores information indicating that the time synchronization has been performed, in the third storage section.

In a nineteenth aspect based on the sixteenth aspect, the communication apparatus further includes a connection result determination section for determining whether the first connection section has succeeded or failed in connection establishment. When the connection result determination section determines that the first connection section has failed in connection establishment, the synchronization section searches for the target apparatus with specifying the frequency band, and performs time synchronization.

Thus, according to the eighteenth and nineteenth aspects, the reliability of connection with a target apparatus can be enhanced while reducing the time required for connection establishment.

A twentieth aspect of the present invention is directed to a computer-readable storage medium having stored therein a communication control program to be executed by a computer of a communication apparatus which performs wireless communication with a target apparatus, and the communication control program causes the computer to function as a first determination section and a first connection section. The first determination section determines, when an instruction for connection establishment is issued, whether or not connection information, which includes target apparatus specifying information that uniquely specifies a predetermined target apparatus, is stored in a first storage section as a predetermined storage medium. The first connection section performs, when the first determination means determines that the connection information is stored in the first storage means, a process for establishing a connection, by wireless communication, to the target apparatus that is specified based on the target apparatus specifying information stored in the first storage means.

A twenty-first aspect of the present invention is directed to a communication control method for controlling a communication apparatus which performs wireless communication with a target apparatus, and the method includes steps as follows: a step of determining, when an instruction for connection establishment is issued, whether or not connection information, which includes target apparatus specifying information that uniquely specifies a predetermined target apparatus, is stored in a first storage section as a predetermined storage medium; and a step of performing, when it is determined that the connection information is stored in the first storage means, a process for establishing a connection, by wireless communication, to the target apparatus that is specified based on the target apparatus specifying information stored in the first storage means.

A twenty-second aspect of the present invention is directed to a communication system having a communication apparatus and a target apparatus, and the communication apparatus includes a first storage section, a first determination section, and a first connection section. The first determination section determines, when an instruction for establishing a connection with the target apparatus is issued, whether or not connection information is stored in the first storage section, the connection information including target apparatus specifying information that uniquely specifies the target apparatus. The first connection section performs, when the first determination section determines that the connection information is stored in the first storage section, a process for establishing a connection, by wireless communication, to the target apparatus that is specified based on the target apparatus specifying information stored in the first storage section. Further, the target apparatus has an information storage section in which the target apparatus specifying information is stored.

Thus, according to the twentieth to twenty-second aspects, the same effect as that of the first aspect can be achieved.

Thus, according to the present invention, the time required for establishing a connection between the communication apparatus and a target apparatus can be reduced.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the drawings. Note that the present invention is not limited to these embodiments.

Embodiment 1

Figure 1:
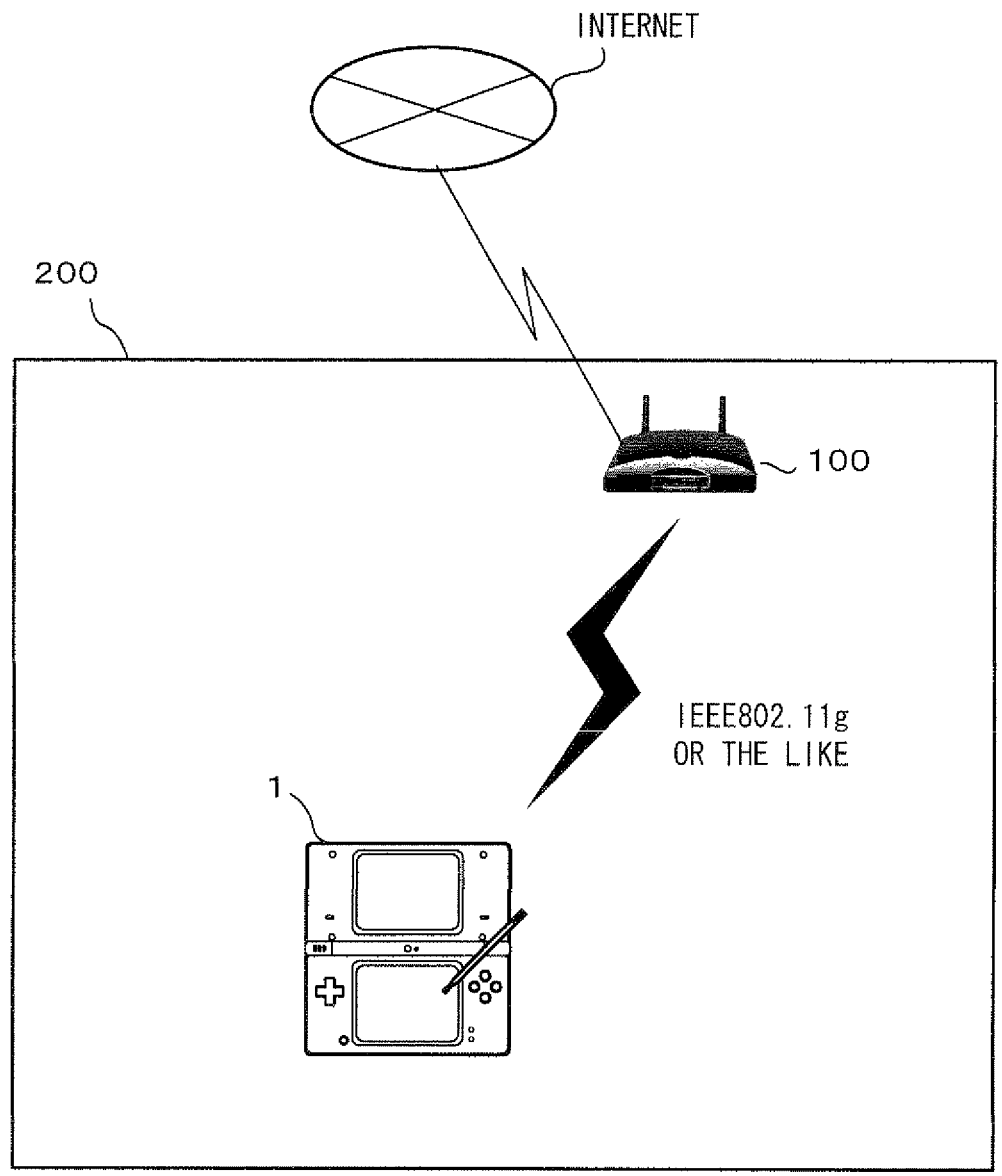
FIG. 1 is a diagram illustrating a whole network assumed in a first embodiment of the present invention.

FIG. 1 is a schematic diagram illustrating a network according to a first embodiment of the present invention. In the first embodiment, a so-called infrastructure mode network is utilized. A user having a communication terminal 1 sets a wireless LAN access point 100 (hereinafter referred to as an AP) on a network at home 200, and connects the communication terminal 1 to the AP 100 by wireless communication. In this embodiment, the AP also functions as a router. Further, in this embodiment, a hand-held game apparatus (hereinafter referred to simply as a game apparatus) described below is adopted as an example of the communication terminal 1. Furthermore, in this embodiment, a protocol (e.g., IEEE 802.11g) based on the IEEE 802.11 standard is used as a wireless communication protocol between the AP 100 and the game apparatus 1.

An ESSID, a BSSID, and a frequency channel in which the AP itself emits an electric wave are previously set in the AP 100. Specifically, the ESSID, the BSSID, and the frequency channel are stored in a storage medium (e.g., a flash memory) provided in the AP 100.

Figure 2:
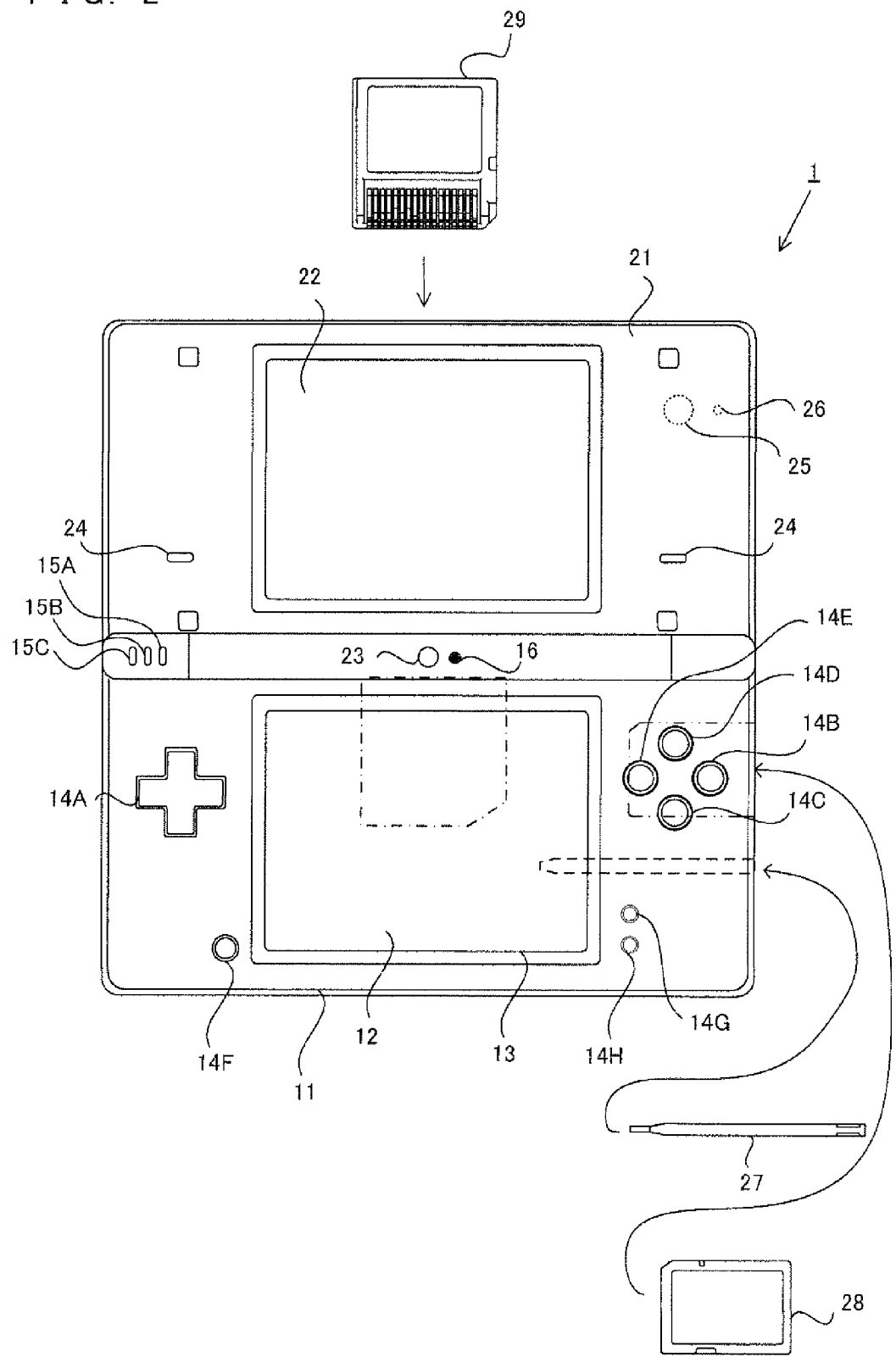
FIG. 2 is an external view of a game apparatus 1.

FIG. 2 is an external view of the game apparatus 1. In FIG. 2, the game apparatus 1 is a foldable hand-held game apparatus in an opened state. The game apparatus 1 is configured to have such a size as to be holdable by a user with both hands or one hand in the opened state.

The game apparatus 1 includes a lower housing 11 and an upper housing 21. The lower housing 11 and the upper housing 21 are connected to each other so as to be capable of being opened or closed (foldable). In the example of FIG. 2, the lower housing 11 and the upper housing 21 are each formed in a plate-like shape of a horizontally long rectangle, and foldably connected to each other at long side portions thereof. Usually, the user uses the game apparatus 1 in the opened state. When not using the game apparatus 1, the user keeps the game apparatus 1 in a closed state. In the example shown in FIG. 2, in addition to the closed state and the opened state, the game apparatus 1 is capable of maintaining an angle between the lower housing 11 and the upper housing 21 at any angle ranging between the closed state and the opened state by a frictional force or the like generated at a connection portion.

In other words, the upper housing 21 can be stationary at any angle with respect to the lower housing 11.

The lower housing 11 is provided with a lower LCD (Liquid Crystal Display) 12. The lower LCD 12 has a horizontally long shape, and is located such that a long side direction thereof corresponds to a long side direction of the lower housing 11. Note that although an LCD is used as a display device provided in the game apparatus 1 in the present embodiment, any other display devices such as a display device using an EL (Electro Luminescence) and the like may be used. In addition, the game apparatus 1 can use a display device of any resolution. Although details will be described below, the lower LCD 12 is used mainly for displaying an image taken by an inner camera 23 or an outer camera 25 in real time.

The lower housing 11 is provided with operation buttons 14A to 14K and a touch panel 13 as input devices. As shown in FIG. 2, among the operation buttons 14A to 14K, the direction input button 14A, the operation button 14B, the operation button 14C, the operation button 14D, the operation button 14E, the power button 14F, the start button 14G, and the select button 14H are provided on an inner main surface of the lower housing 11 which is located inside when the upper housing 21 and the lower housing 11 are folded. The direction input button 14A is used, for example, for a selection operation and the like. The operation buttons 14B to 14E are used, for example, for a determination operation, a cancellation operation, and the like. The power button 14F is used for turning on or off the power of the game apparatus 1. In the example shown in FIG. 2, the direction input button 14A and the power button 14F are provided on the inner main surface of the lower housing 11 and on one of a left side and a right side (on the left side in FIG. 2) of the lower LCD 12 provided in the vicinity of the center of the inner main surface of the lower housing 11. Further, the operation buttons 14B to 14E, the start button 14G, and the select button 14H are provided on the inner main surface of the lower housing 11 and on the other of the left side and the right side (on the right side in FIG. 1) of the lower LCD 12. The direction input button 14A, the operation buttons 14B to 14E, the start button 14G, and the select button 14H are used for performing various operations on the game apparatus 1.

Note that the operation buttons 14I to 14K are omitted in FIG. 2. For example, the L button 14I is provided at a left end of an upper surface of the lower housing 11, and the R button 14J is provided at a right end of the upper surface of the lower housing 11. The L button 14I and the R button 14J are used, for example, for performing a photographing instruction operation (shutter operation) on the game apparatus 1. In addition, the volume button 14K is provided on a left side surface of the lower housing 11. The volume button 14K is used for adjusting volume of speakers of the game apparatus 1.

The game apparatus 1 further includes the touch panel 13 as another input device in addition to the operation buttons 14A to 14K. The touch panel 13 is mounted on the lower LCD 12 so as to cover the screen of the lower LCD 12. In the present embodiment, the touch panel 13 is, for example, a resistive film type touch panel. However, the touch panel 13 is not limited to the resistive film type, but any press-type touch panel may be used. The touch panel 13 used in the present embodiment has the same resolution (detection accuracy) as that of the lower LCD 12. However, the resolution of the touch panel 13 and that of the lower LCD 12 may not necessarily be the same with each other. In a right side surface of the lower housing 11, an insertion opening (indicated by a dashed line in FIG. 2) is provided. The insertion opening is capable of housing a touch pen 27 which is used for performing an operation on the touch panel 13. Although an input onto the touch panel 13 is usually performed using the touch pen 27, in addition to the touch pen 27, a finger of the user can be used for operating the touch panel 13.

In the right side surface of the lower housing 11, an insertion opening (indicated by a two-dot chain line in FIG. 1) for housing a memory card 28 is provided. Inside the insertion opening, a connector (not shown) is provided for electrically connecting the game apparatus 1 to the memory card 28. The memory card 28 is, for example, an SD (Secure Digital) memory card, and detachably mounted on the connector. The memory card 28 is used, for example, for storing an image taken by the game apparatus 1, and loading an image generated by another apparatus into the game apparatus 1.

Further, in the upper surface of the lower housing 11, an insertion opening (indicated by a chain line in FIG. 1) for housing a cartridge 29 is provided. Inside the insertion opening, a connector (not shown) is provided for electrically connecting the game apparatus 1 to the cartridge 29. The cartridge 29 is a storage medium storing a game program and the like, and detachably inserted in the insertion opening provided in the lower housing 11.

Three LEDs 15A to 15C are mounted on a left side part of the connection portion where the lower housing 11 and the upper housing 21 are connected to each other. The game apparatus 1 is capable of performing wireless communication with another apparatus, and the first LED 15A is lit up while the power of the game apparatus 1 is ON. The second LED 15B is lit up while the game apparatus 1 is being charged. The third LED 15C is lit up while wireless communication is established. Thus, by the three LEDs 15A to 15C, a state of ON/OFF of the power of the game apparatus 1, a state of charge of the game apparatus 1, and a state of communication establishment of the game apparatus 1 can be notified to the user.

Meanwhile, the upper housing 21 is provided with an upper LCD 22. The upper LCD 22 has a horizontally long shape, and is located such that a long side direction thereof corresponds to a long side direction of the upper housing 21. In a similar manner to that of the lower LCD 12, a display device of another type having any resolution may be used instead of the upper LCD 22. A touch panel may be provided so as to cover the upper LCD 22. On the upper LCD 22, for example, an operation explanation screen for teaching the user the roles of the operation buttons 14A to 14K and the touch panel 13 is displayed.

Further, the upper housing 21 is provided with two cameras (the inner camera 23 and the outer camera 25). As shown in FIG. 2, the inner camera 23 is mounted in an inner main surface in the vicinity of the connection portion of the upper housing 21. On the other hand, the outer camera 25 is mounted in a surface opposite to the surface in which the inner camera 23 is mounted, namely, in an outer main surface of the upper housing 21. The outer main surface is located on the outside of the game apparatus 1 in the closed state, and the back surface of the upper housing 21 shown in FIG. 2. In FIG. 2, the outer camera 25 is indicated by a dotted line. Thus, the inner camera 23 is capable of taking an image in a direction in which the inner main surface of the upper housing 21 faces, and the outer camera 25 is capable of taking an image in a direction opposite to an imaging direction of the inner camera 23, namely, in a direction in which the outer main surface of the upper housing 21 faces. In other words, in the present embodiment, the two cameras 23 and 25 are provided such that the imaging directions thereof are opposite to each other. For example, the user can take an image of a view seen from the game apparatus 1 toward the user with the inner camera 23 as well as an image of a view seen from the game apparatus 1 in a direction opposite to the user with the outer camera 25.

In the inner main surface in the vicinity of the connection portion, a microphone (a microphone 42 shown in FIG. 3) is housed as a voice input device. In the inner main surface in the vicinity of the connection portion, a microphone hole 16 is provided to allow the microphone 42 to detect sound outside the game apparatus 1. The position where the microphone 42 is housed and the position of the microphone hole 16 are not necessarily in the vicinity of the connection portion. For example, the microphone 42 may be housed in the lower housing 11, and the microphone hole 16 may be formed in the lower housing 11 so as to correspond to the housing position of the microphone 42.

In the outer main surface of the upper housing 21, a fourth LED 26 (indicated by a dashed line in FIG. 2) is mounted. The fourth LED 26 is lit up at a time when photographing is performed (when the shutter button is pressed) by the outer camera 25. Further, the fourth LED 26 is lit up while a moving picture is being taken by the outer camera 25. The fourth LED 26 notifies to an object person whose image is taken and people around the object person that photographing is performed (being performed) by the game apparatus 1.

Sound holes 24 are formed in the inner main surface of the upper housing 21 and on the left and right sides, respective y, of the upper LCD 22 provided in the vicinity of the center of the inner main surface of the upper housing 21. The speakers are housed in the upper housing 21 and at the back of the sound holes 24. The sound holes 24 are holes through which sound from the speakers is released to the outside of the game apparatus 1.

As described above, the upper housing 21 is provided with the inner camera 23 and the outer camera 25 which are components for taking an image, and the upper LCD 22 which is display means for displaying, for example, an operation explanation screen at the time of photographing. On the other hand, the lower housing 11 is provided with the input devices (the touch panel 13 and the buttons 14A to 14K) for performing an operation input to the game apparatus 1, and the lower LCD 12 which is display means for displaying the game screen. Accordingly, when using the game apparatus 1, the user can hold the lower housing 11 and perform an input to the input device while seeing an image (an image taken by one of the cameras) displayed on the lower LCD 12.

Figure 3:
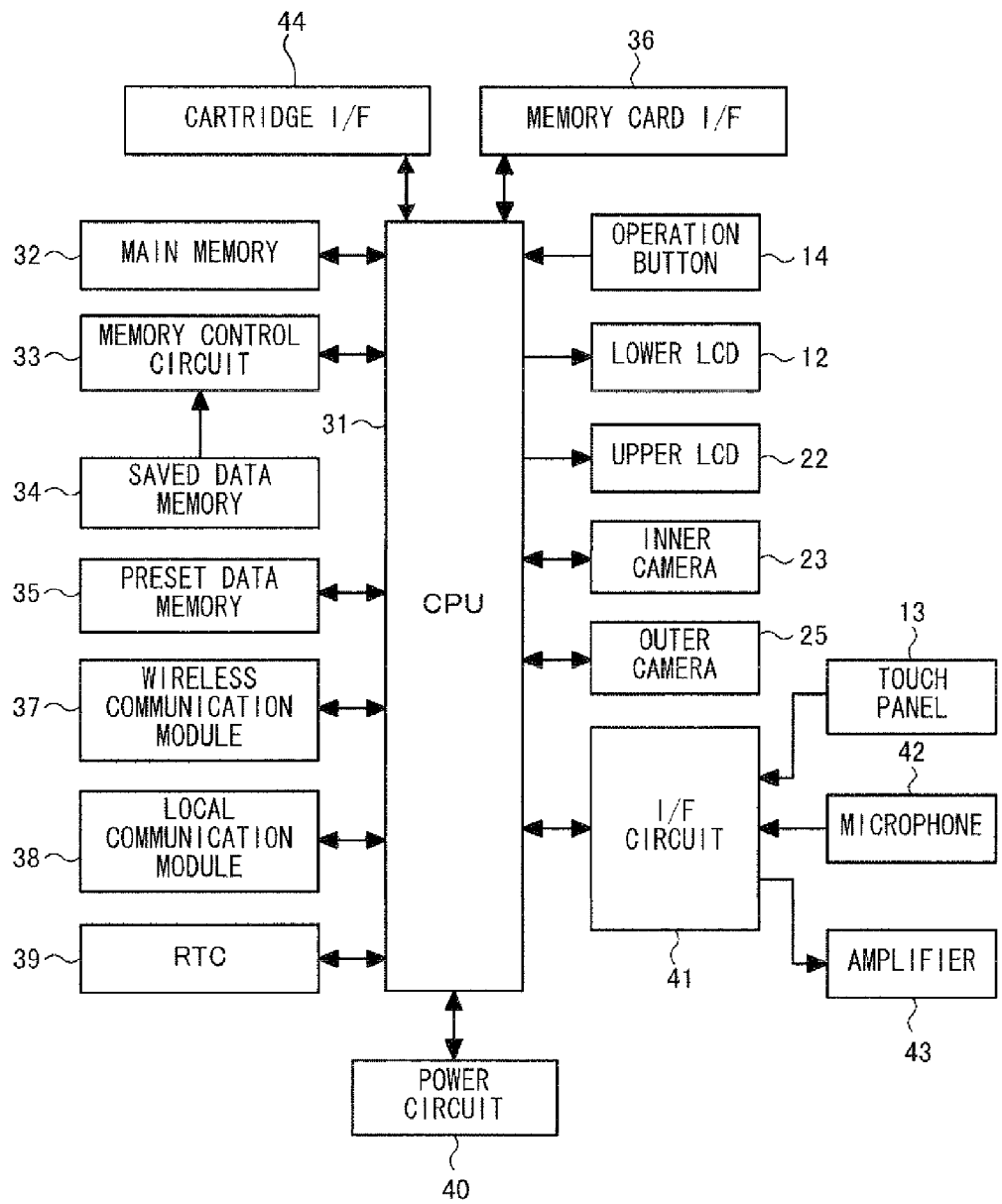
FIG. 3 is a block diagram illustrating an example of an internal structure of the game apparatus 1.

Now, an internal configuration of the game apparatus 1 will be described with reference to FIG. 3. FIG. 3 is a block diagram showing an example of the internal configuration of the game apparatus 1.

As shown in FIG. 3, the game apparatus 1 includes electronic components including a CPU 31, a main memory 32, a memory control circuit 33, a saved data memory 34, a preset data memory 35, a memory card interface (memory card I/F) 36 and a cartridge I/F 44, a wireless communication module 37, a local communication module 38, a real time clock (RTC) 39, a power circuit 40, an interface circuit (I/F circuit) 41, and the like. These electronic components are mounted on an electronic circuit substrate and housed in the lower housing 11 (or in the upper housing 21).

The CPU 31 includes an information processor for executing a predetermined program. In the present embodiment, the predetermined program is stored in a memory (e.g. the saved data memory 34) within the game apparatus 1 or in the memory card 28 and/or the cartridge 29, and the CPU 31 performs later-described game processing by executing the predetermined program. Note that a program to be executed by the CPU 31 may be previously stored in a memory within the game apparatus 1, may be obtained from the memory card 28 and/or the cartridge 29, or may be obtained from another apparatus by performing communication with the other apparatus. For example, a program may be downloaded via the Internet from a predetermined server. Alternatively, a predetermined program stored in a stationary game apparatus may be downloaded by performing communication with the stationary game apparatus.

The main memory 32, the memory control circuit 33, and the preset data memory 35 are connected to the CPU 31. The saved data memory 34 is connected to the memory control circuit 33. The main memory 32 includes a storage used as a work area and a buffer area of the CPU 31. In the present embodiment, for example, a PSRAM (Pseudo-SRAM) is used as the main memory 32. The saved data memory 34 includes a storage for storing a program executed by the CPU 31, data of images taken by the inner camera 23 and the outer camera 25, and the like. The saved data memory 34 is constructed of a nonvolatile storage medium, for example, a NAND flash memory, in the present embodiment. The memory control circuit 33 is a circuit for controlling reading and writing of data from and into the saved data memory 34 in accordance with an instruction from the CPU 31. The preset data memory 35 includes a storage for storing data (preset data) of various parameters and the like which are previously set in the game apparatus 1. A flash memory connected to the CPU 31 via an SPI (Serial Peripheral Interface) bus can be used as the preset data memory 35.

The memory card I/F 36 is connected to the CPU 31. The memory card I/F 36 reads and writes data from and into the memory card 28 mounted on the connector in accordance with an instruction from the CPU 31. In the present embodiment, data of images taken by the outer camera 25 is written into the memory card 28, and image data stored in the memory card 28 is read from the memory card 28 to be stored in the saved data memory 34.

The cartridge I/F 44 is connected to the CPU 31. The cartridge I/F 44 reads out data from the cartridge 29 mounted to the connector or writes data to the cartridge 29 in accordance with an instruction from the CPU 31. In the present embodiment, an application program executable by the game apparatus 1 is read out from the cartridge 29 to be executed by the CPU 31, and data regarding the application program (e.g. saved data and the like of a game) is written to the cartridge 29.

A program relating to a connection process of the present embodiment may be supplied to a computer system via a wired or wireless communication line, instead of being supplied to the computer system via an external storage medium such as the cartridge 29 or the like. Alternatively, the program relating to the connection process may be previously stored in a nonvolatile storage unit within the computer system. An information storage medium for storing the program relating to the connection process is not limited to the above-mentioned nonvolatile storage unit, but may be a CD-ROM, a DVD, or an optical disc-shaped storage medium similar to them.

The wireless communication module 37 functions to connect to a wireless LAN, by a method that conforms to the standard of IEEE 802.11.b/g. The local communication module 38 functions to wirelessly communicate with a game apparatus by a predetermined communication method. The wireless communication module 37 and the local communication module 38 are connected to the CPU 31. The CPU 31 is capable of receiving and transmitting data from and to another apparatus via the Internet using the wireless communication module 37, and capable of receiving and transmitting data from and to another game apparatus using the local communication module 38.

The RTC 39 and the power circuit 40 are connected to the CPU 31. The RTC 39 counts a time, and outputs the time to the CPU 31. For example, the CPU 31 is capable of calculating a current time (date) and the like based on the time counted by the RTC 39. The power circuit 40 controls an electric power supplied from a power supply (typically, a battery housed in the lower housing 11) of the game apparatus 1 to supply the electric power to each of the components of the game apparatus 1.

The game apparatus 1 includes the microphone 42 and an amplifier 43. The microphone 42 and the amplifier 43 are connected to the I/F circuit 41. The microphone 42 detects voice produced by the user toward the game apparatus 1, and outputs a sound signal indicating the voice to the I/F circuit 41. The amplifier 43 amplifies the sound signal from the I/F circuit 41, and causes the speakers (not shown) to output the sound signal. The I/F circuit 41 is connected to the CPU 31.

The touch panel 13 is connected to the I/F circuit 41. The I/F circuit 41 includes a sound control circuit for controlling the microphone 42 and the amplifier 43 (the speakers), and a touch panel control circuit for controlling the touch panel 13. The sound control circuit performs A/D conversion or D/A conversion of the sound signal, and converts the sound signal into sound data in a predetermined format. The touch panel control circuit generates touch position data in a predetermined format, based on a signal from the touch panel 13, and outputs the touch position data to the CPU 31. For example, the touch position data is data indicating coordinates of a position at which an input is performed to an input surface of the touch panel 13. The touch panel control circuit reads a signal from the touch panel 13 and generates touch position data every predetermined period of time. The CPU 31 is capable of recognizing a position at which an input is performed to the touch panel 13, based on the touch position data obtained via the I/F circuit 41.

An operation button 14 includes the above-mentioned operation buttons 14A to 14K, and is connected to the CPU 31. The operation button 14 outputs, to the CPU 31, operation data indicating an input state of each of the buttons 14A to 14K (whether or not each button is pressed). The CPU 31 obtains the operation data from the operation button 14, and executes a process in accordance with an input performed on the operation button 14.

The inner camera 23 and the outer camera 25 are connected to the CPU 31. Each of the inner camera 23 and the outer camera 25 takes an image in accordance with an instruction from the CPU 31, and outputs data of the taken image to the CPU 31. In the present embodiment, the CPU 31 gives an imaging instruction to either of the inner camera 23 or the outer camera 25, and the camera which has received the imaging instruction takes an image and transmits image data to the CPU 31.

The lower LCD 12 and the upper LCD 22 are connected to the CPU 31. Each of the lower LCD 12 and the upper LCD 22 displays an image thereon in accordance with an instruction from the CPU 31.

Hereinafter, an outline of a connection establishing process according to the first embodiment will be described. In the first embodiment, a process described below is executed for establishing a wireless communication between various communication terminals (in this embodiment, the game apparatus 1) and a communication apparatus (in this embodiment, the AP 100). First, information that can uniquely identify a target apparatus (the AP 100), in other words, information that can individually specify the target apparatus, is stored in the game apparatus 1. Further, information about a wireless channel to be used for the wireless communication (e.g., a channel number; any of channels 1 to 11 in the case of IEEE 802.11g) is also stored in the game apparatus 1. A specific storage method will be described later. When an instruction to establish connection with the AP 100 is issued in the game apparatus 1 (this instruction is included in, for example, an instruction to make connection to the Internet, which is issued in a game program), the game apparatus 1 starts, using the stored information, the connection establishing process from the state where the AP 100 (i.e., a destination of connection) and the channel to be used for the communication have already been specified.

Figure 4:
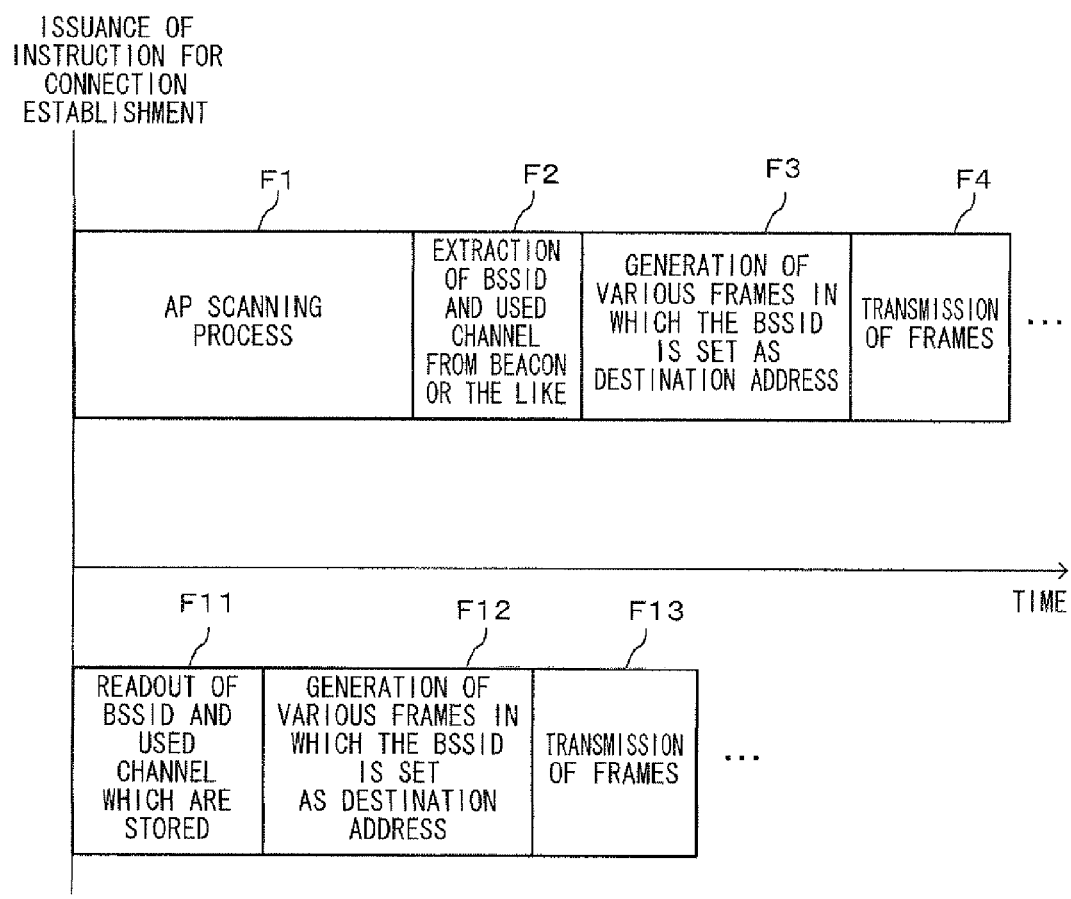
FIG. 4 is a schematic diagram illustrating a concept of a connection establishing process of the first embodiment.

FIG. 4 is a schematic diagram illustrating a concept of the connection establishing process of the first embodiment in comparison with the conventional connection establishing process. In FIG. 4, the flow of time is shown from left to right (i.e., shown by a right arrow in the center). The conventional connection establishing process is shown above the arrow while the connection establishing process of the present embodiment is shown beneath the arrow. In the conventional process, when a request for connection establishment is issued in the game apparatus 1, available wireless channels are scanned by passive scan or ESSID-specified active scan, and thus searching for an AP 100 as a connection target is performed (process F1 in FIG. 4).

Next, a BSSID and a used channel number are extracted from a beacon frame received by the game apparatus 1 in the case of the passive scan, or from a probe response frame received by the game apparatus 1 in the case of the active scan (process F2 in FIG. 4). The BSSID is generally expressed by a MAC address. That is, the BSSID is expressed by a MAC address of the AP 100.

Then, various frames (an association request frame and the like) in which the BSSID is set as a destination address are generated, and an authentication request and a connection request are transmitted to the AP 100 via the wireless channel indicated by the used channel number (processes F3 and F4 are repeated as necessary), thereby attempting to establish connection with the AP 100. The aforementioned processes are performed every time a connection request is issued in the game apparatus 1. The reason is as follows. In a wireless communication mode, such as a public wireless LAN service, a plurality of APs exist, and the APs have the same ESSID, and different wireless channels and different BSSIDs which are set depending on the places where the APs are installed, and the game apparatus 1 can be connected to any of these APs.

On the other hand, in the first embodiment, when connection has been established with the AP 100 installed at home (i.e., when connection with the AP 100 has succeeded) through the aforementioned processes, the BSSID of the AP 100 and the channel number of the wireless channel used for the communication are stored in the game apparatus 1. Thereafter, when the game apparatus 1 is disconnected from the AP 100 and a connection request is again issued in the game apparatus 1, the stored BSSID and channel number are read out (process F11) without performing the aforementioned scanning process (process F1). Then, various frames in which the read BSSID is specified as a destination address are generated, and the frames are transmitted via the wireless channel of the read channel number (processes F12 and F13), thereby attempting to establish connection with the AP 100.

The reason is as follows. In the case where the game apparatus 1 is always connected to the same AP, such as the AP 100 in the home network, the BSSID and the used channel are hardly changed. Therefore, it is hardly required to respecify the BSSID and the used channel every time a connection request is issued.

Further, in the case where the game apparatus 1 is connected more frequently to the AP 100 in the home network than to the AP in the public wireless LAN service or the like, the convenience of the user is enhanced if the game apparatus 1 can be speedily connected to the AP 100 in the home network. Therefore, in the first embodiment, the BSSID of the AP 100 to which the game apparatus 1 has once been successfully connected and the channel number used for this successful connection are stored in the game apparatus 1. Then, the subsequent connection establishing process is started from the state where the AP 100 as the destination of connection (i.e., the destination address) and the channel to be used for the communication have been specified, using the stored BSSID and the stored used channel number. As a result, the time for the conventional passive scan or active scan is not required, and thereby the time required for establishing a connection between the game apparatus 1 and the AP 100 is reduced. In the following description, the aforementioned method for connecting the game apparatus 1 to the AP 100 using the stored BSSID and the stored used channel number is referred to as "direct connection", in order to distinguish the same from the conventional connection establishing method.

Further, in the present embodiment, in order to reliably connect the game apparatus 1 to the AP 100 according to the aforementioned direct connection, a process (probe request/response) like active scan is performed, with the used channel number being specified, thereby performing synchronization of TSF (Time Synchronization Function) timers. The TSF timers are counters used for time synchronization between the AP and the game apparatus 1. Thereby, time synchronization is achieved between the transmission end and the reception end, resulting in more stable transmission/reception. In the following description, this process is referred to as "synchronous scan". Since the "synchronous scan" is performed, with the wireless channel being specified based on the stored channel number, the time required until the probe response frame is received is reduced as compared with the conventional active scan in which all the channels are scanned.

Figure 5:
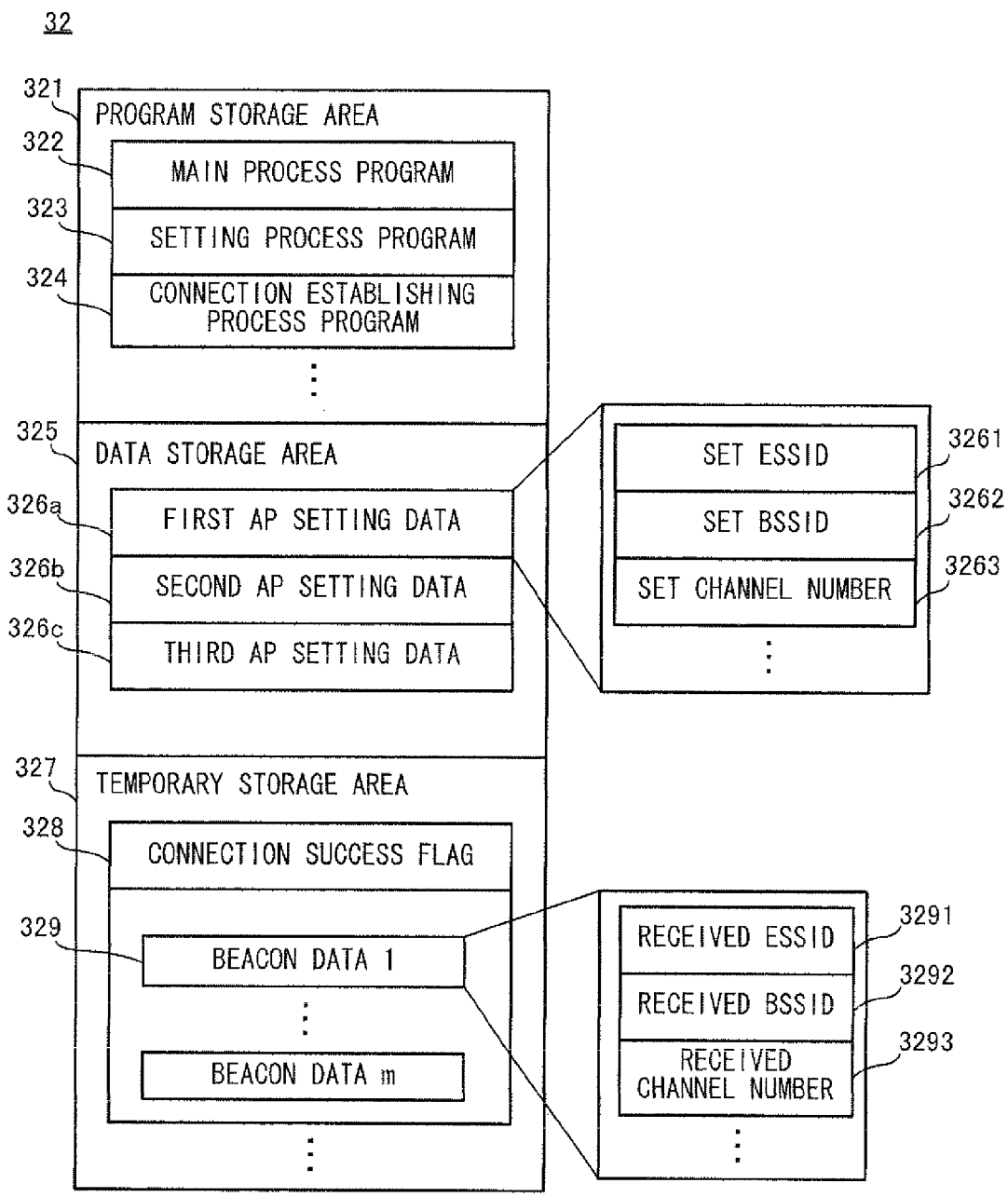
FIG. 5 is a diagram illustrating a memory map of a main memory 32 in the game apparatus 1.

The following describes the details of a connection-related process (a process including the aforementioned connection establishing process) to be executed by the game apparatus 1 of the first embodiment. First, data to be stored in the main memory 32 during the connection-related process will be described. FIG. 5 is a diagram showing a memory map of the main memory 32 of the game apparatus 1. In FIG. 5, the main memory 32 includes a program storage area 321, a data storage area 325, and a temporary storage area 327. In the program storage area 321, programs are stored in, for example, the cartridge 29 and the saved data memory 34, and are transmitted to and stored in the main memory 32 when executing the connection-related process. Further, in the data storage area 325, data are stored in the saved data memory 34, and are transmitted to and stored in the main memory 32 when executing the connection-related process. The programs and the data may be provided by a storage medium such as a memory card or a hard disk, instead of the cartridge 29 and the saved data memory 34. Alternatively, the programs and the data may be provided by downloading the same from a predetermined server or game apparatus via a wired network or a wireless network. That is, the downloaded programs and data may be stored in the main memory 32. On the other hand, in the temporary storage area 327, data are generated as needed, and temporarily stored, during the connection-related process of the present embodiment.

The program storage area 321 stores programs to be executed by the CPU 31, and the programs include a main process program 322, a setting process program 323, a connection establishing process program 324, and the like. The main process program 322 is a program corresponding to processes in a flowchart of FIG. 6 described later. The setting process program 323 is a program which causes the CPU 31 to execute a process of preliminary setting information (profile) relating to wireless connection. The connection establishing process program 324 is a program which causes the CPU 31 to execute a process of establishing connection with the AP 100.

In the data storage area 325, first AP setting data 326a, second AP setting data 326b, third AP setting data 326c, and the like are stored. Each of the data is connection information (profile) to be used for connecting the game apparatus 1 to a specific AP. In this embodiment, pieces of connection information of three APs can be stored. Further, among the three data, priority order (connection priorities) is determined to be used for connection establishment to be described later. In the present embodiment, the first AP setting data 326a has the highest priority, and the third AP setting data 326c has the lowest priority. Hereinafter, these data may be sometimes collectively referred to as AP setting data 326. Any of these data may be sometimes referred to as n-th AP setting data (n means any of 1 to 3). Each of the AP setting data 326 includes a preset ESSID 3261, a preset BSSID 3262, and a preset channel number 3263. The preset ESSID 3261 is data indicating an ESSID of a wireless network as a connection target. Taking the first AP setting data 326a as an example, the preset ESSID 3261 is data indicating the ESSID of the first AP. In this embodiment, setting of the preset ESSID 3261 is performed based on a user's input operation (i.e., it has been manually set) in the setting process to be described later.

The preset BSSID 3262 is data indicating a BSSID (for example, a MAC address) of an AP as a connection target. The preset channel number 3263 is data indicating a wireless channel number to be used for wireless communication with the AP as the connection target. Setting of the preset BSSID 3262 and the preset channel number 3263 is automatically performed when a connection with a specific AP is established, as part of the connection establishing process to be described later.

Further, in each AP setting data 326, a WEP key, a WPA key, and the like, which are pieces of information required for encrypted communication, may be stored as necessary, in addition to the aforementioned data.

The AP setting data is appropriately copied from the main memory 32 to the saved data memory 34 to be stored therein.

In the temporary storage area 327, a connection success flag 328 and beacon data 329 are stored. The connection success flag 328 is a flag indicating whether or not connection with the AP has succeeded, as a result of the connection establishing process. The connection success flag 328 is set to ON when the connection has succeeded, and to OFF when the connection has failed.

In the beacon data 329, a beacon frame is stored, which has been received by passive scan executed in the connection establishing process to be described later. The beacon data 329 is incremented every time a beacon frame is received. In FIG. 5, "beacon data 1" to "beacon data m" are shown. Each beacon data 329 includes a received ESSID 3291, a received BSSID 3292, a received channel number 3293, and the like. The received ESSID 3291 is data in which the ESSID included in the received beacon frame is stored. The received ESSID 3292 is data in which the BSSID included in the received beacon frame is stored. The received channel number 3293 is data in which the wireless channel number included in the received beacon frame is stored. That is, the received channel number 3293 indicates the number of the wireless channel used for transmission of the received beacon. In other words, the received channel number 3293 is information indicating the number of the wireless channel which is used for wireless communication by the AP transmitting the beacon.

Further, in the temporary storage area 327, various kinds of flags to be used in subsequent processes are stored.

Figure 6:
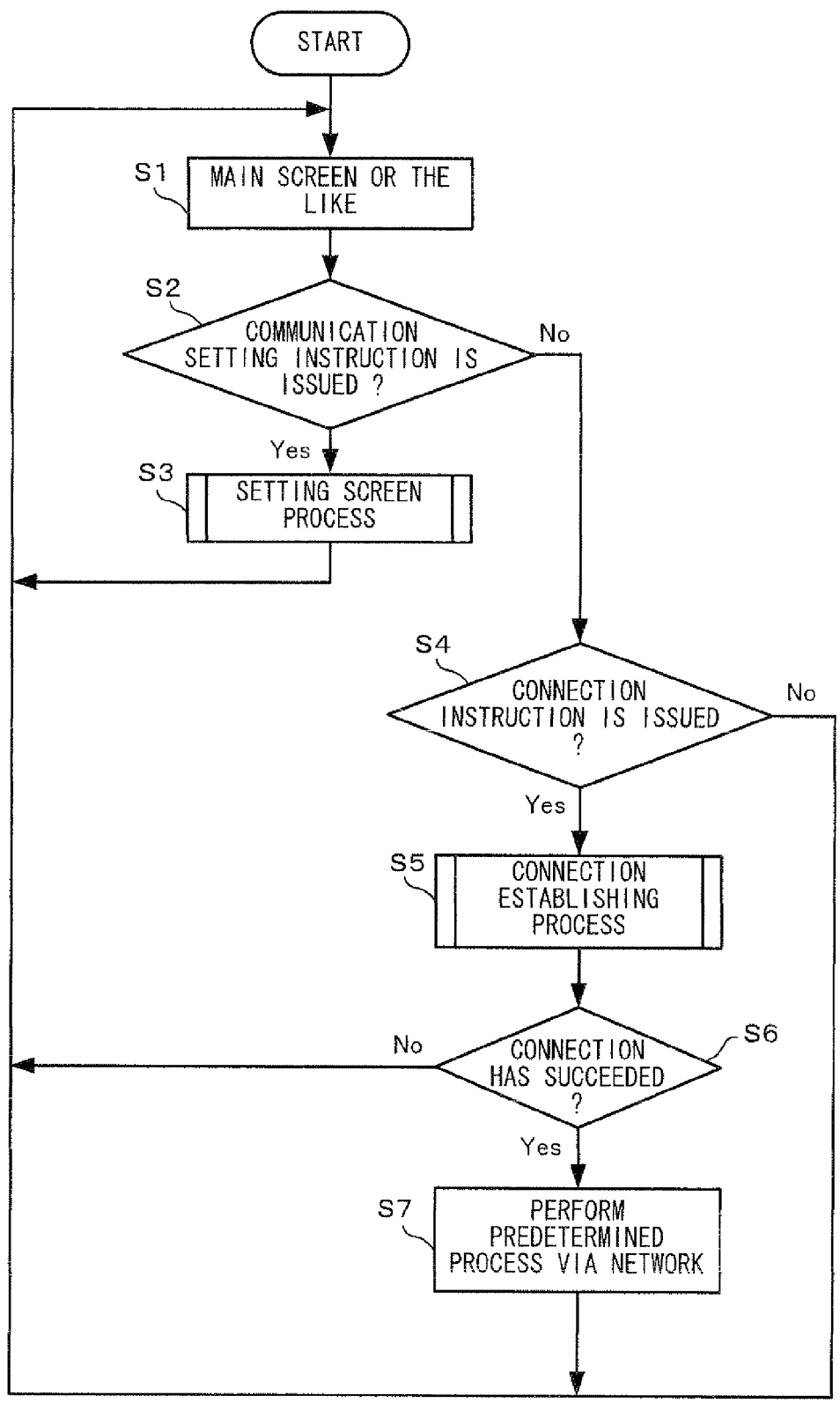
FIG. 6 is a flowchart illustrating a connection-related process of the first embodiment.

Hereinafter, the connection-related process to be executed by the game apparatus 1 will be described with reference to FIGS. 6 to 12. FIG. 6 is a flowchart showing the flow of the connection-related process to be executed by the game apparatus 1. When the game apparatus 1 is powered on, the CPU 31 of the game apparatus 1 executes a boot program stored in a boot ROM (not shown), thereby initializing the respective units such as the main memory 32. Then, the respective programs stored in the cartridge 29 and the AP setting data 326 stored in the saved data memory 34 are read into the main memory 32, thereby starting execution of the connection-related process program. As a result, a predetermined image is displayed on the lower LCD 12, thereby starting the process of the present embodiment. Since the process (e.g., the specific contents of the game processing) other than the connection-related process is not directly related to the present invention, description thereof will be omitted.

First, in step S1, a main screen of the game apparatus 1 is displayed. This main screen is, for example, a menu screen. The menu screen allows the user to start various applications such as "game processing", "camera processing", and the like, or to start "process for setting communication". The menu screen accepts an input operation performed by the user.

Next, in step S2, it is determined whether or not the user has made an input operation to start the "process for setting communication". When the result of the determination indicates that the user has made an input operation to start the "process for setting communication" (YES in step S2), a setting screen process is executed in step S3. Specifically, a process for setting connection information to be used for establishing connection with an AP is executed based on the user's input. The setting screen process will be later described in more detail. When the setting screen process in step S3 is completed, the process returns to step S1.

On the other hand, when it is determined that the user has not made an input operation to start the "process for setting communication" (NO in step S2), it is determined in step S4 whether or not "connection instruction" has been issued. The "connection instruction" is issued during, for example, a process relating to a specific online game which has been started from the menu screen. Alternatively, it is issued when an Internet browser program is started from the menu screen.

When the result of the determination in step S4 indicates that no "connection instruction" has been issued (NO in step S4) the process returns to step S1 to repeat the aforementioned steps. If a game processing or a predetermined application has been started from the menu screen, the process relating to the game or application is continued.

On the other hand, when the result of the determination in step S4 indicates that a "connection instruction" has been issued (YES in step S4), a connection establishing process for establishing connection with an AP is executed in step S5. The details of this process will be described later.

When the connection establishing process is completed, it is determined in step S6 whether or not a connection has been successfully established as a result of the connection establishing process. Specifically, it is determined whether or not the connection success flag 328 is set to ON. When the result of the determination indicates that the connection success flag 328 is set to OFF (NO in step S6), the process returns to step S1 to repeat the aforementioned steps.

On the other hand, when it is determined that the connection success flag 328 is set to ON (YES in step S6), a predetermined process utilizing the network via the AP with which a connection has been established is executed in step S7. For example, an online battle game processing or the like is executed. When this process is ended, the process returns to step S7. For example, when the user ends the online game, the menu screen is displayed.

Figure 7:
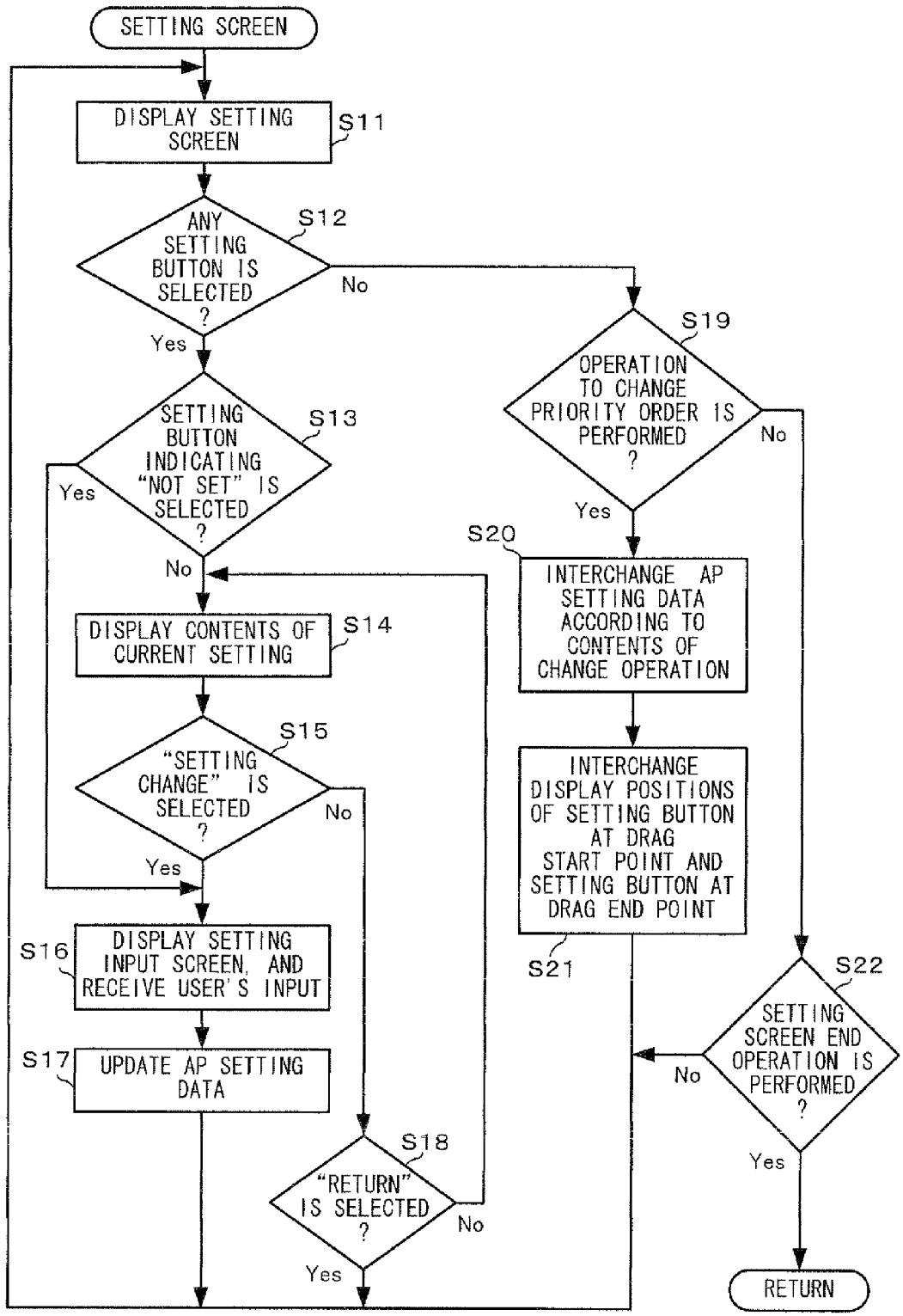
FIG. 7 is a flowchart illustrating details of a setting screen process shown in step S3 in FIG. 6.
Figure 8:
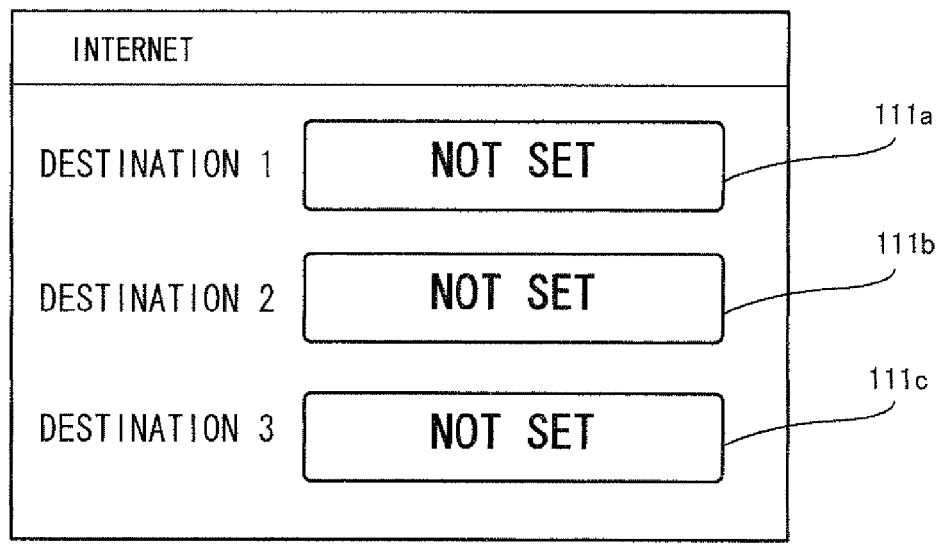
FIG. 8 is a diagram illustrating an example of a setting screen.

The following describes the details of the setting screen process shown in step S3. In this process, a setting screen is displayed, and a process for setting an ESSID of an AP as a destination is executed according to a user's input. FIG. 7 is a flowchart showing the details of the setting screen process. First, in step S11, a screen for setting communication is generated and displayed on the lower LCD 12. FIG. 8 shows an example of this screen. On the screen, setting buttons 111a, 111b, and 111c corresponding to the three pieces of AP setting data 326, respectively, are displayed (hereinafter these buttons may be sometimes collectively referred to as setting buttons 111). Each setting button 111 has, displayed therein, information indicating whether or not the corresponding AP setting data 328 has already been set. FIG. 8 shows the case where none of the AP setting data 326 is set. Therefore, "NOT SET" is displayed on each setting button 111. If the AP setting data 326 has already been set for the setting button 111, it is indicated by displaying, for example, "AP 1" and/or the set ESSID, on the setting button 111.

In FIG. 8, the setting buttons 111a, 111b, and 111c correspond to the AP setting data 326a, 326b, and 326c, respectively. Further, "DESTINATION 1" to "DESTINATION 3" are displayed on the screen at the left side of the respective setting buttons 111, as labels for the respective setting buttons 111. Hereinafter, the destination AP in the AP setting data 326a corresponding to the setting button 111a is referred to as "destination 1". Likewise, the APs corresponding to the setting buttons 111b and 111c are referred to as "destination 2" and "destination 3", respectively. The user performs an operation to select one of the three setting buttons (e.g., an operation to touch the button), thereby displaying the setting screen of the AP setting data 326 corresponding to the selected button.

In FIG. 8, the order of the setting buttons 111 also indicates the order of priorities of APs to be connected. An AP corresponding to a setting button 111 placed at a higher position has a higher priority. More specifically, when a connection instruction is issued, connection to the "destination 1" is first attempted. When connection to the "destination 1" has failed, connection to the "destination 2" is attempted. When connection to the "destination 2" has failed, connection to the "destination 3" is attempted. Further, in the present embodiment, the order of priorities given to the setting buttons 111 can be changed by vertically dragging the setting buttons 111. In the example shown in FIG. 8, when the setting button 111a is dragged onto the position of the setting button 111b, an animation in which the display positions of the setting buttons 111a and 111b are interchanged is displayed, and thus the priorities thereof are interchanged. More specifically, the AP setting data 326a corresponding to the setting button 111a and the AP setting data 326b corresponding to the setting button 111b are interchanged to interchange the priorities thereof. That is, in accordance with the priority changing operation, the pre-change AP setting data 326b is reconfigured as the AP setting data 326a, while the pre-change AP setting data 326a is reconfigured as the AP setting data 326b.

Referring again to FIG. 7, in step S12, it is determined whether or not any of the three setting buttons 111 has been selected by the user. When the result of the determination indicates that any of the setting buttons 111 has been selected (YES in step S12), it is determined in step S13 whether or not the selected setting button 111 is a setting button 111 in which the aforementioned "NOT SET" is displayed. That is, it is determined whether or not a setting button 111 corresponding to an AP setting data 326 in its unset state has been selected. When the result of the determination indicates that a setting button 111 indicating "NOT SET" has been selected (YES in step S13), the process goes to step S16 as described later where a setting operation for the unset AP setting data is performed.

Figure 9:
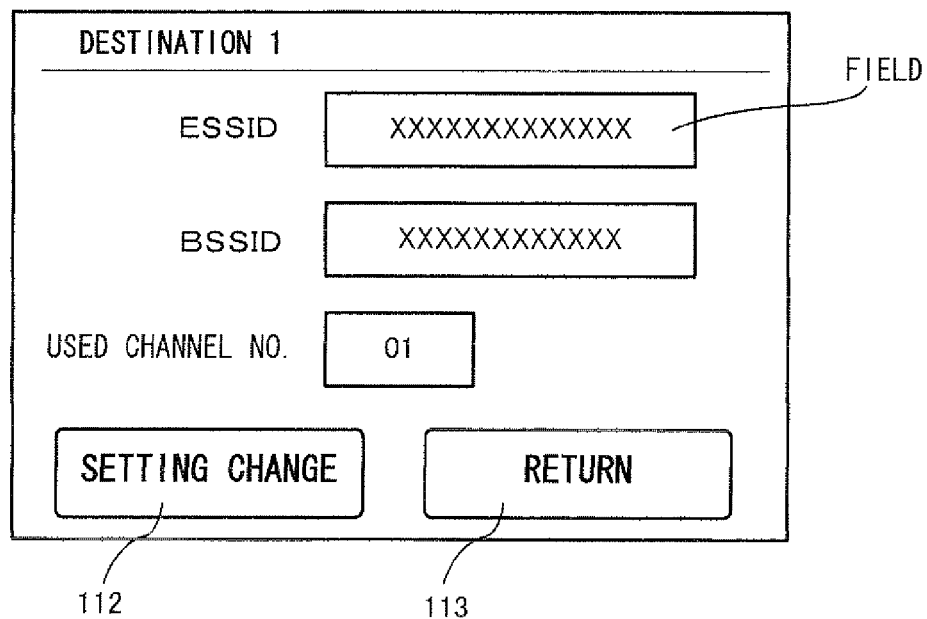
FIG. 9 is a diagram illustrating an example of a setting screen.

On the other hand, when it is determined that a setting button 111 indicating "NOT SET" is not selected (NO in step S13), a screen showing the set contents of the AP setting data 326 corresponding to the selected setting button 111 is displayed. Simultaneously, an input from the user is accepted. FIG. 9 shows an example of this screen. In the screen shown in FIG. 9, "ESSID", "BSSID", and "USED CHANNEL NO." are displayed as the set contents of "DESTINATION 1". Further, a "SETTING CHANGE" button 112 and a "RETURN" button 113 are also displayed. The user can change the set contents of the ESSID by selecting the "SETTING CHANGE" button 112. Further, the user can return to the screen shown in FIG. 8 by selecting the "RETURN" button 113. In FIG. 9, the "BSSID" and the "USED CHANNEL NO." are displayed when these data exist in the AP setting data 326. The reason is as follows. In the setting screen process, the user inputs the ESSID. Therefore, there may be a situation where the ESSID is included in the AP setting data 326, and the BSSID and the used channel number remain unset.

Referring again to FIG. 7, in step S15, it is determined whether or not the "SETTING CHANGE" button 112 has been selected by the user on the screen showing the set contents. When the result of the determination indicates that the "SETTING CHANGE" button 112 is selected (YES in step S15), a screen for inputting setting is displayed in the next step S16 to accept a user's input. The screen for inputting setting (not shown) allows the user to input the ESSID. For example, a display color of a field section indicating the value of the ESSID in FIG. 9 is changed, and a cursor is displayed in the field section. Further, at this time, an "INPUT COMPLETED" button is also displayed as necessary in the screen for inputting setting. When the user selects the "INPUT COMPLETED" button after he/she has completed the ESSID inputting operation, the input contents are determined, and the process goes to the next step S17. Alternatively, the user may input the ESSID as follows. That is, beacons are scanned in the respective channels, and the beacons including the ESSID, among the received beacons, are listed. Then, the user selects one of the beacons listed, thereby inputting the ESSID.

In step S17, the AP setting data 326 is updated based on the contents of the user's input. More specifically, the preset ESSID 3261 in the corresponding AP setting data 326 (in the example of FIG. 9, the first AP setting data 326a) is updated with the value of the ESSID inputted by the user onto the setting input screen. At this time, the updated AP setting data 326 in the main memory 32 is copied into the saved data memory 34. Thereafter, the process returns to step S11 to repeat the aforementioned steps.

On the other hand, when the result of the determination in step S15 indicates that the "SETTING CHANGE" button is not selected (NO in step S15), t is determined in step S18 whether or not the "RETURN" button 113 is selected. When it is determined that the "RETURN" button 113 is selected (YES in step S18), the process returns to step S11. When it is determined that the "RETURN" button 113 is not selected (NO in step S18), the process returns to step S14.

The following describes a process to be performed when the result of the determination in step S12 indicates that none of the three setting buttons 111 corresponding to the AP setting data 326a to 326c is selected (NO in step S12). At this time, in step S19, it is determined whether or not an operation to change the priority order is performed. The operation to change the priority order is an operation to vertically drag any of the setting buttons 111 so as to change the order of the setting buttons 111. Here, as an example of the operation to change the priority order, an operation to drag the setting button 111a to the position of the setting button 111b will be described. When it is determined that the operation to change the priority order has been performed (YES in step S19), the contents of the AP setting data 326 are interchanged according to the contents of the drag operation. In this example, a process of interchanging the contents of the first AP setting data 326a and the contents of the second AP setting data 326b is executed. In the next step S21, the display contents are changed, i.e., the display positions of the setting buttons 111 are changed, in accordance with the drag operation. In this example, a process of interchanging the display position of the setting button 111a and the display position of the setting button 111b is executed. Thereafter, the process returns to step S11.

On the other hand, when the result of the determination in step S19 indicates that the operation to change the priority order is not performed (NO in step S19), it is determined in step S22 whether or not an operation to exit the setting screen has been performed. When the result of the determination indicates that the exit operation is not performed (NO in step S22), the process returns to step S11. When it is determined that the exit operation has been performed (YES in step S22), the setting screen process is ended.

Figure 10:
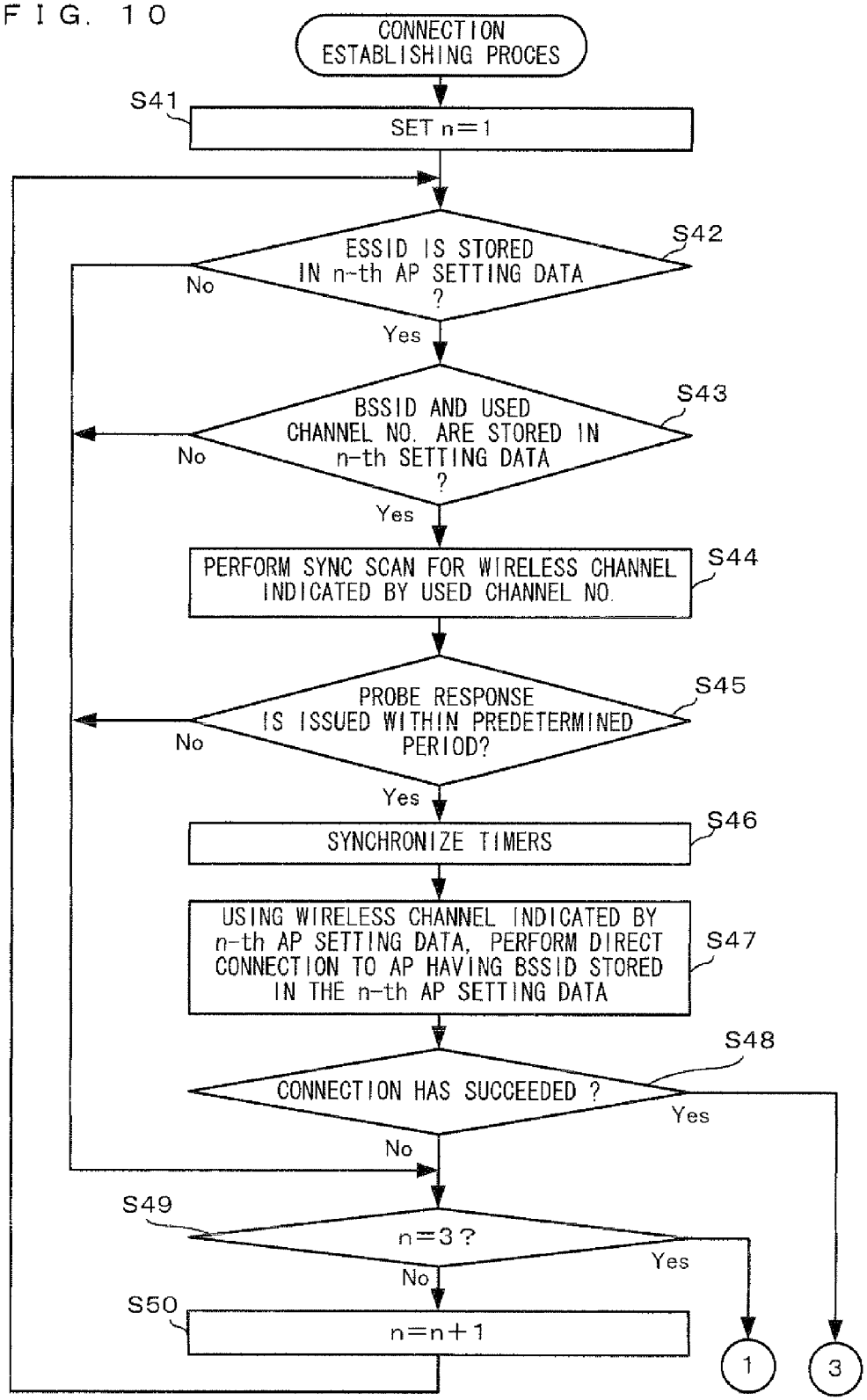
FIG. 10 is a flowchart illustrating details of a connection establishing process shown in step S5 in FIG. 6.
Figure 11:
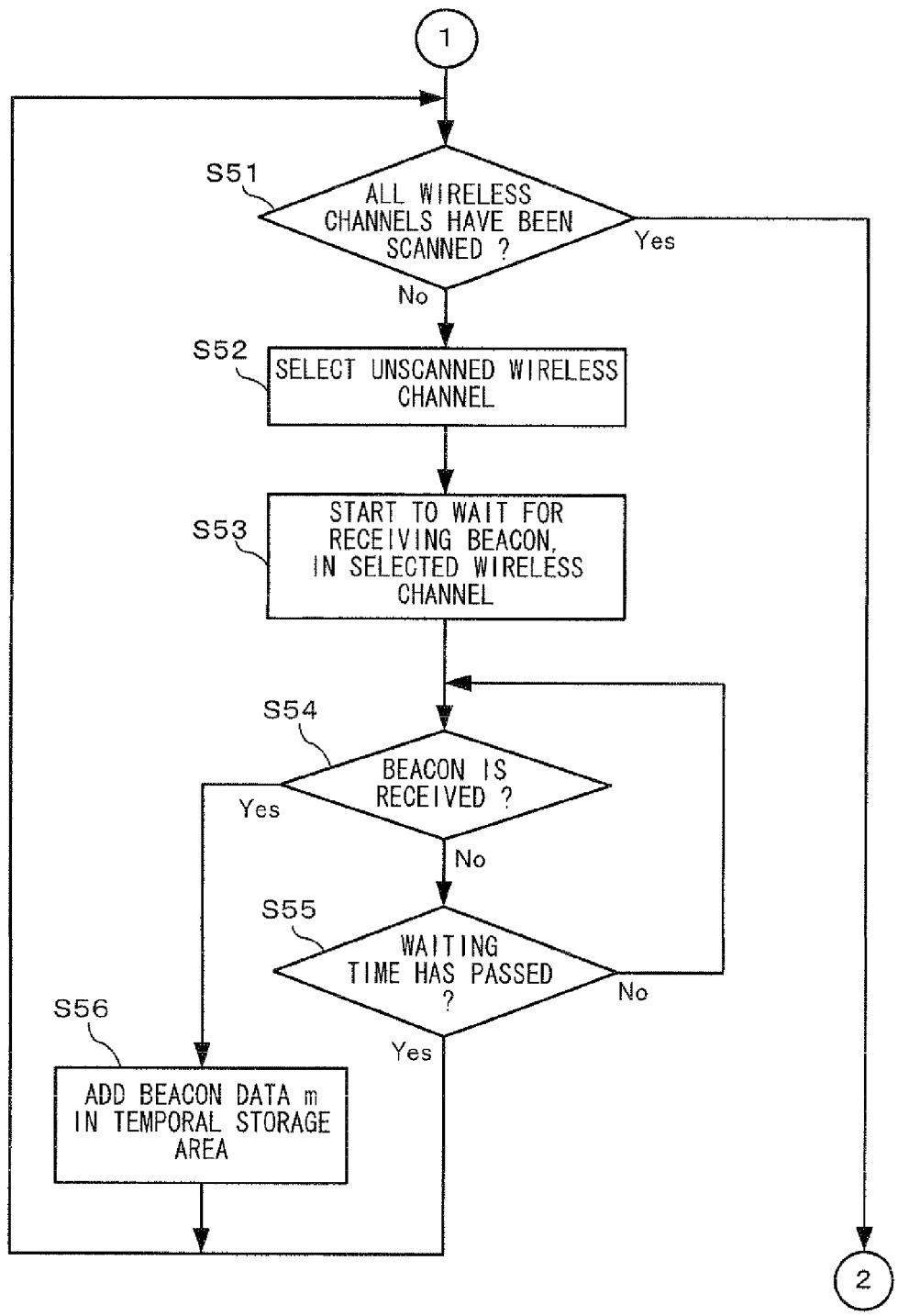
FIG. 11 is a flowchart illustrating details of the connection establishing process shown in step S5 in FIG. 6.
Figure 12:
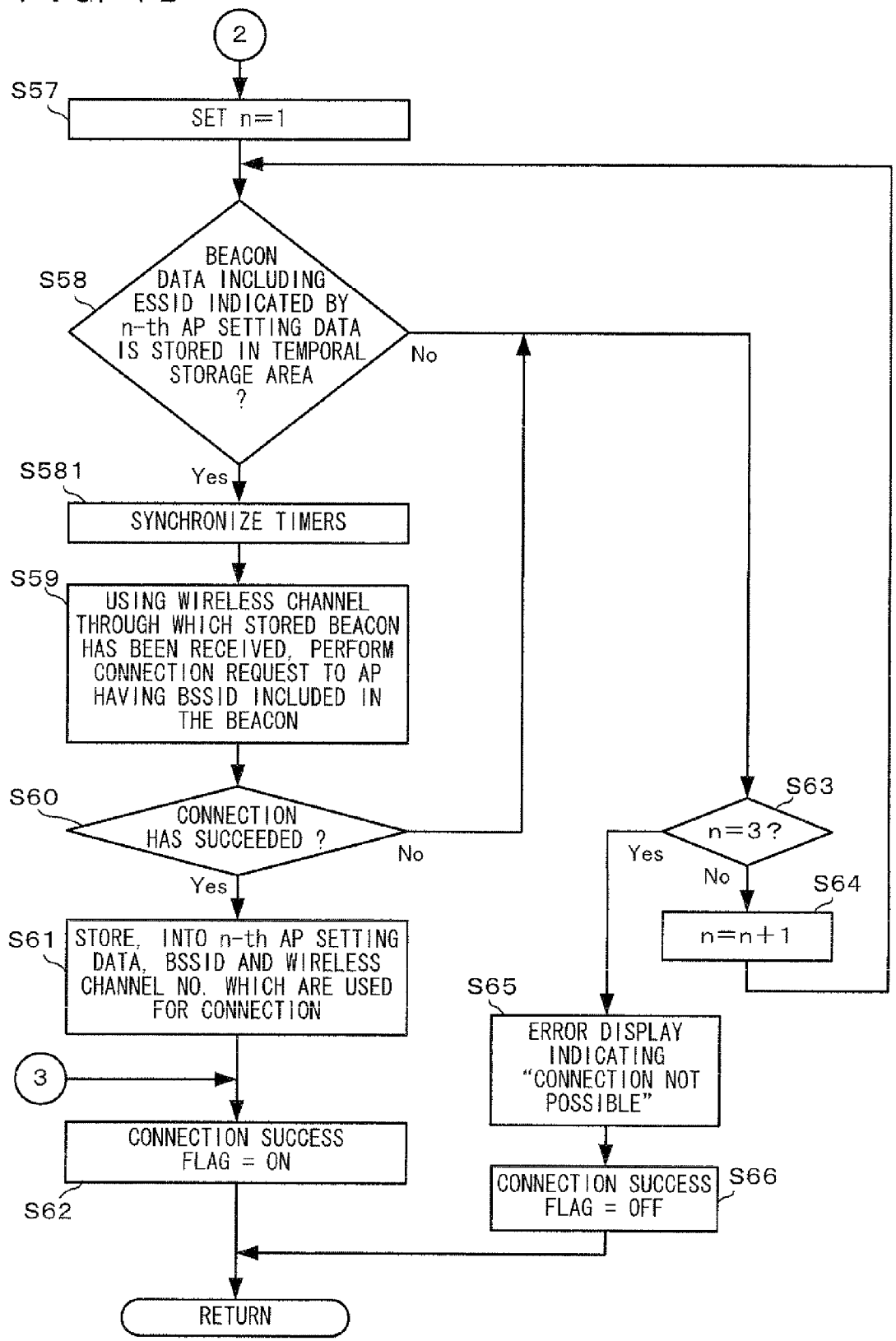
FIG. 12 is a flowchart illustrating details of the connection establishing process shown in step S5 in FIG. 6.

Next, the details of the connection establishing process relating to step S5 in FIG. 6 will be described. FIGS. 10 to 12 are flowcharts illustrating the details of the connection establishing process. Initially, in step S41, "1" is set as a variable n. This variable is for specifying one of the aforementioned three "destinations", i.e., one of the AP setting data 326a to 326c. For example, when n=1, the first AP setting data 326a is specified.

Next, in step S42, it is determined whether the preset ESSID 3261 is stored or not, with reference to the n-th AP setting data (n is a number indicated by the variable n). Specifically, it is determined whether no ESSID is set or an ESSID has already been set in the aforementioned setting screen process. When the result of the determination indicates that the preset ESSID 3261 is not included in the n-th AP setting data (NO in step S42), the process goes to step S49 described later. On the other hand, when it is determined that the preset ESSID 3261 is included in the n-th AP setting data (YES in step S42), it is determined in the next step S43 whether or not the preset BSSID 3262 and the preset channel number 3263 are included in the n-th AP setting data. That is, it is determined whether or not there has been an experience of successful connection in the past. As described above, in the present embodiment, the BSSID and the used channel number are stored when connection with the AP has succeeded.

When the result of the determination indicates that the preset BSSID 3262 and the preset channel number 3263 are not included in the n-th AP setting data (NO in step S43), the process goes to step S49 described later. On the other hand, when it is determined that the preset BSSID 3262 and the preset channel number 3263 are included in the n-th AP setting data (YES in step S43), the aforementioned "synchronous scan" is executed on the wireless channel indicated by the preset channel number 3263 in the following step S44. More specifically, a probe request frame is transmitted to the wireless channel indicated by the preset channel number 3263. In the probe request frame, the aforementioned preset ESSID 3261 is set as an ID of the targeted network. When the AP 100 receives the probe request frame, the AP 100 determines whether or not the ESSID stored in the storage medium thereof matches the ESSID included in the probe request frame. When there is a match, the AP 100 transmits a probe response frame including a TSF timer value.

Next, in step S45, it is determined whether or not the probe response frame to the probe request frame has been received within a predetermined period (e.g., a prescribed channel monitoring time). When the result of the determination indicates that the probe response frame has not been received within the prescribed period (NO in step S45), the process goes to step S49 described later. On the other hand, when it is determined that the probe response frame has been received within the prescribed period (YES in step S45), the aforementioned TSF timer synchronizing process is executed. Specifically, first, the value of the TSF timer included in the probe response frame is extracted. Then, a process of adjusting the timer of the game apparatus 1 to the extracted value of the TSF timer is executed.

After the synchronization of the TSF timers is completed, a process of attempting the aforementioned "direct connection" to the AP 100 is executed in step S47. More specifically, first, the preset BSSID 3262 included in the n-th AP setting data is extracted. Next, various frames (e.g., an authentication request frame, a connection request frame, and the like) for connection establishment, in which the value of the preset BSSID 3262 is set as a destination address, are generated. Then, the generated frames are transmitted using the wireless channel indicated by the preset channel number 3262 included in the n-th AP setting data. Thereafter, if there is a response from the AP 100, transmission and reception of various frames for connection establishment are performed with the AP 100, and a process for establishing connection with the AP 100 is executed.

Next, in step S48, it is determined whether or not connection with the AP 100 has been established as a result of the "direct connection" (i.e., whether or not the "direct connection" has succeeded). When the result of the determination indicates that connection with the AP 100 has been established (YES in step S48), the process goes to step S62 described later. Thereafter, the connection establishing process is ended.

On the other hand, when it is determined that connection with the AP 100 has not been established (NO in step S48), it is determined in step S49 whether or not the value of the variable n is "3". That is, it is determined whether or not the "direct connection" has been attempted on the three "destinations". When the result of the determination indicates that the variable n is not "3" (NO in step S49), 1 is added to the variable n in step S50. Then, the process returns to step S42 to repeat the aforementioned steps.

On the other hand, when it is determined that the variable n is "3" (YES in step S49), it is considered that the "direct connections" to the three APs (destinations) have failed. Therefore, a process of searching for an AP by using passive scan and attempting to establish connection with this AP is executed. Specifically, in step S51 in FIG. 11, it is determined whether or not all the available wireless channels have been passively scanned. When the result of the determination indicates that not all the wireless channels have been passively scanned (NO in step S51), the wireless channels which are not yet passively scanned are selected in step S52. The order of selection (the order of scanning) may be arbitrarily determined. For example, the wireless channels may be scanned in the order of channels 1, 2, 3, . . . , 11. Alternatively, the odd-numbered wireless channels may be first scanned and then the even-numbered wireless channels may be scanned. In this case, the wireless channels are scanned in the order of channels 1, 3, 5, . . . , 11, 2, 4, 6, . . . , 10.

Next, in step S53, a process of waiting for reception of beacon frames in the selected wireless channels is started. That is, "standby for beacon frames" is started.

Next, in step S54, it is determined whether or not a beacon frame has been received. When the result of the determination indicates that no beacon frame has been received (NO in step S54), it is determined in step S55 whether or not a prescribed waiting time (e.g., 200 ms) has elapsed. When the result of the determination indicates that the waiting time has not elapsed (NO in step S55), the process returns to step S54 to continue standby for beacon frames.

On the other hand, when the result of the determination in step S54 indicates that a beacon frame has been received (YES in step S54), the received beacon frame is additionally stored in the temporary storage area 327 as beacon data m (m is a number starting from 1, and is counted up 1 by 1) in step S56. Then, the process returns to step S51, and the process of passively scanning other unscanned wireless channels is repeated.

On the other hand, when the result of the determination in step S51 indicates that all the wireless channels have been passively scanned (YES in step S51), "1" is set as the variable n in step S57 in FIG. 12. In the following step S58, it is determined whether or not beacon data 329 having the same ESSID as the preset ESSID 3261 in the n-th AP setting data is included in the beacon data stored in the temporary storage area 327. When it is determined that such beacon data 329 is stored (YES in step S58), a process of synchronizing the TSF timers is executed in step S581. Specifically, first, the value of the TSF timer included in the beacon data 329 having the same ESSID as the preset ESSID 3261 is extracted. Then, a process of adjusting the timer of the game apparatus 1 to the extracted value of the TSF timer is executed.

Next, in step S59, the received BSSID 3292 included in the beacon data 329 is obtained, and a frame for connection request in which the received BSSID 3292 is set as a destination is generated. Then, the generated frame is transmitted using the wireless channel indicated by the received channel number 3293 included in the beacon data 329 thereby making a connection request to the AP. Thereafter, transmission and reception of various frames for connection establishment are performed between the game apparatus 1 and the AP.

Next, in step S60, it is determined whether or not connection with the AP has been established (whether or not connection has succeeded). When the result of the determination indicates that connection with the AP has not been established (NO in step S60), the process goes to step S63 described later. On the other hand, when it is determined that connection to the AP has been established (YES in step S60), the wireless channel number and the BSSID which are used for this connection with the AP are included in the n-th AP setting data. That is, the wireless channel number used for the connection with the AP is included as the preset channel number 3263 in the n-th AP setting data, and the BSSID used for the connection with the AP is included as the preset BSSID 3262 in the n-th AP setting data. In the following step S62, the connection success flag 328 is set to ON to complete the connection establishing process.

On the other hand, when it is determined in step S58 that the beacon data 329 including the same ESSID as the preset ESSID 3261 included in the n-th AP setting data is not stored in the temporary storage area 327 (NO in step S58), or when it is determined in step S60 that connection with the AP has failed (NO in step S60), it is determined in step S63 whether or not the variable n is "3" When it is determined that the variable n is not "3" (NO in step S63), 1 is added to the variable n in step S64, and the process returns to step S58 to repeat the aforementioned steps.

On the other hand, when it is determined that the variable n is "3" (YES in step S63), it is considered that none of the APs set as the three "destinations" has been found. In this case, in step S65, a process of displaying, on the screen, an error message indicating that connection to the network failed is executed. In the following step S66, the connection success flag 328 is set to OFF to complete the connection establishing process. This is the end of the description of the connection establishing process according to the first embodiment.

As described above, according to the first embodiment, when wireless connection between the game apparatus 1 and the AP 100 has succeeded, the BSSID and used channel information of the AP 100 which are used for the wireless communication, are stored in the game apparatus 1. In the subsequent connection establishing process, the game apparatus 1 attempts to establish connection with the AP 100 by using the stored information, without performing active scan or passive scan for each channel.

Further, when the game apparatus 1 attempts to establish connection with the AP 100 by using the stored information, the aforementioned "synchronous scan" is performed to achieve synchronization of the TSF timers. Thus, the reliability of the connection is enhanced.

In the aforementioned embodiment, the settings of three APs as destinations (the first to third AP setting data 326a to 326c) are stored. The number of AP settings to be stored is not limited thereto. For example, four or more AP settings may be stored. Further, only one AP setting having the highest priority (i.e., only the first AP setting data 326a) may be stored. In this case, if direct connection using the first AP setting data 326a has failed (NO in step S48), the process may go to step S51 in FIG. 11. Further, when the result of passive scan indicates that a beacon including the ESSID of the first AP setting data 326a has not been found (NO in step S58), or when a beacon including the ESSID has been found but connection establishment has failed (NO in step S60), the process goes to step S65.

Further, in the aforementioned embodiment, a so-called infrastructure mode network configuration is adopted as an example of a network configuration. However, the present invention is not limited thereto, and is also applicable to a so-called ad-hoc network configuration. For example, the present invention is applicable to a case where two game apparatuses 1 respectively owned by two brothers are mutually connected in the ad-hoc mode at home. This is because, also in the ad-hoc mode, the aforementioned beacon frame and probe response frame are transmitted.

Further, in the aforementioned embodiment, the IEEE 802.11 standard is adopted as an example of communication standard. However, the present invention is not limited thereto, and is also applicable in the case of using another wireless communication system. In this case, the elements "ESSID" "BSSID", and "used channel" may be replaced with other elements indicating identifiers and a frequency band having similar meanings.

Further, the aforementioned embodiment adopts a hand-held game apparatus as an example of the game apparatus 1. However, the present invention is not limited thereto, and is also applicable to a stationary game apparatus capable of wireless communication. Further, the present invention is also applicable to a personal computer capable of wireless communication, and various hand-held terminals capable of wireless communication which are typified by a PDA (Personal Digital Assistant) and a smartphone.

Further, the aforementioned embodiment adopts passive scan in the processes in steps S51 to S56 shown in FIG. 11. However, active scan may be performed in these processes instead of passive scan. In this case, a probe response frame is used instead of a beacon frame.

Further, in the aforementioned embodiment, three AP settings are stored, and priorities are given thereto. In the example of FIG. 8, when connection to the "destination 1" has failed, connection to the "destination 2" and further connection to the "destination 3" are attempted. However, the present invention is not limited to this control method. For example, when connection to the "destination 1" has failed, an error message may be displayed without attempting further connections to other preset APs ("destination 2" and "destination 3") to complete the connection establishing process. For example, when the result of the determination in step S60 in FIG. 12 is "NO", the process goes to step S65.

Further, the aforementioned embodiment adopts the drag operation as an example of the operation to change the order of priorities of the respective settings on the setting screen (refer to FIG. 8). However, operations other than the drag operation may be adopted. For example, the priority order may be changed according to an input in the vertical direction using the direction input button 14A, or a priority order number may be directly input or specified.

Further, in the aforementioned embodiment, when, for the "destination 1", its ESSID is stored but its BSSID and used channel are not stored (NO in step S43 in FIG. 10), direct connection to the "destination 2" is attempted according to the priority order. However, the present invention is not limited thereto. In such a case, before attempting direct connection to the "destination 2" having the next priority, passive scan or active scan may be performed, directed to the "destination 1". That is, an AP having the ESSID of the "destination 1" may be searched for (e.g., the processes in steps S51 to S61 in FIG. 11 are performed). When the AP is found, and connection to the AP is established, the BSSID and the used channel may be stored at this time. This will be described more specifically below. For example, it is assumed that the ESSID, the BSSID, and the used channel have already been set for the "destination 1", while only the ESSID has been set for the "destination 2". Then, if the priorities of the "destination 1" and the "destination 2" are interchanged, a situation may occur in which only the ESSID is set for the "destination 1" having the higher priority. In this case, even when direct connection to the "destination 1" has failed, connection to the "destination 1" can be established by performing passive scan or active scan using the preset ESSID. Thereby, the game apparatus 1 is prevented from attempting to establish connection to APs of lower priorities even when the setting of the "destination 1" is insufficient.

Further, when the ESSID is set on the setting screen, connection to the AP having the ESSID may be attempted. If the connection has succeeded at this time point, the BSSID and the used channel number may be stored at this time point. That is, in addition to the ESSID, the BSSID and the used channel number may be obtained and stored during the setting screen process. Thereby, the aforementioned "direct connection" can be performed at the time of the first connection establishing process after the setting process using the setting screen.

In the aforementioned embodiment, the BSSID and the used channel number are displayed in addition to the ESSID on the setting screen (refer to FIG. 9). However, the BSSID and the used channel number may not be displayed.

Furthermore, in order to determine whether or not AP setting has already been performed, it is determined in step S42 in FIG. 10 whether or not the ESSID is included in the AP setting data 326, while it is determined in step S43 whether or not the BSSID and the used channel number are included in the AP setting data 326. That is, whether or not AP setting has already been performed is determined based on the presence/absence of the data. Alternatively, a specific flag such as "AP preset flag" may be previously provided, and when the AP setting is stored, this flag is set to ON and stored in the saved data memory 34. When performing the determination in step S42 and/or S43, whether or not AP setting has already been performed may be determined depending on whether or not the flag is set to ON.

In the aforementioned embodiment, the used channel number is included in the AP setting data 326 and stored. However, the used channel number is not necessarily stored. For example, when a frequency band to be used for wireless communication has previously been fixed, i.e., when there is only one used channel number, the used channel number need not be stored.

If connection to a preset AP has failed, the preset BSSID 3262 and the preset channel number 3263 which are stored relating to this AP may be erased. In this case, preferably, the number of times of connection failures is counted, and the BSSID 3262 and the channel number 3263 are erased when the count reaches a prescribed number.

Embodiment 2

The following describes a game apparatus and a process thereof according to a second embodiment of the present invention. A function block diagram of the game apparatus of the second embodiment and a block diagram illustrating a hardware configuration thereof are identical to those of the first embodiment (refer to FIGS. 2 and 3). Further, a network configuration of the second embodiment is also identical to that of the first embodiment (refer to FIG. 1). In this second embodiment, however, a program that is partially different from that of the first embodiment is stored in the main memory 32, and the CPU 31 executes the program to realize a function different from that of the first embodiment.

Hereinafter, the outline of the process according to the second embodiment will be described. In the first embodiment, "synchronous scan" is executed in every connection establishing process (refer to steps S44 to S46 in FIG. 10). In contrast to the first embodiment, in this second embodiment, after the game apparatus 1 is powered on and the "synchronous scan" is first executed to synchronize the TSF timer of the game apparatus 1 with that of the AP, execution of the "synchronous scan" is skipped in the connection establishing process until the game apparatus 1 is powered OFF. The reason is as follows. Once the TSF timer of the game apparatus 1 is synchronized with that of the AP, deviation might not occur between the TSF timers for a while. Therefore, the process relating to the "synchronous scan" is skipped during this period.

Figure 13:
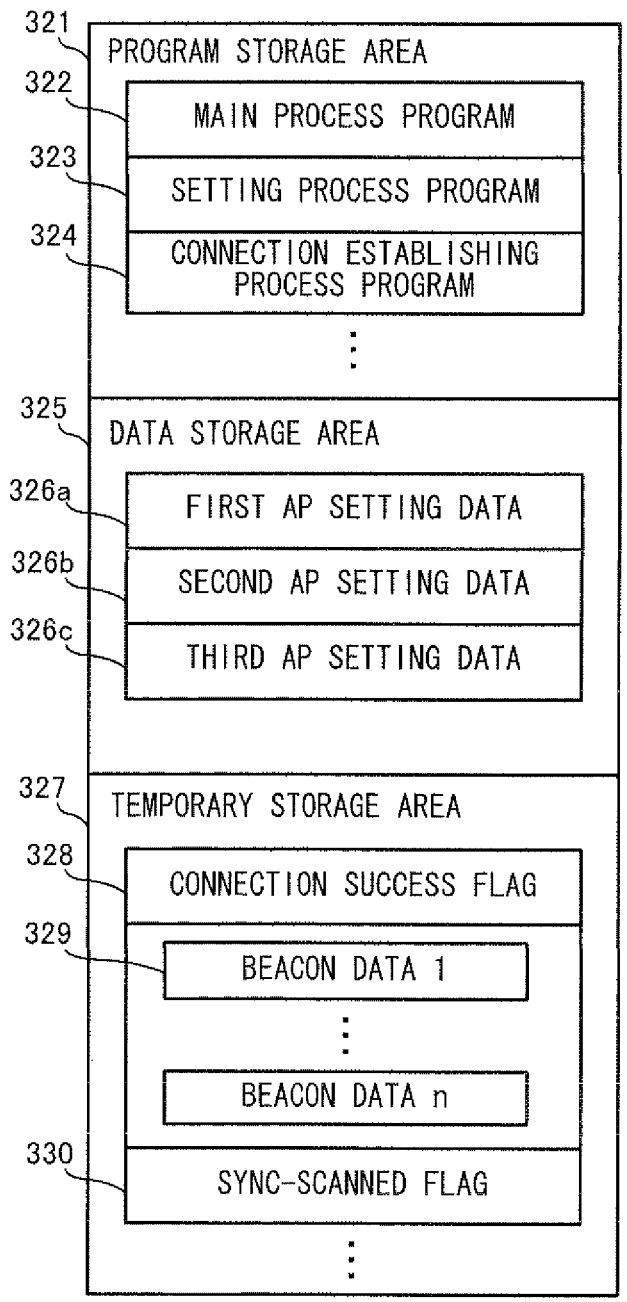
FIG. 13 is a diagram illustrating a memory map of a main memory 32 in a game apparatus 1 of a second embodiment.

FIG. 13 illustrates a memory map of the main memory 32 of the second embodiment. The memory map of the second embodiment is obtained by adding a sync-scanned flag 330 into the temporary storage area 327 of the memory map of the first embodiment described with reference to FIG. 5. Further, the process contents of the connection establishing process program 324 of the second embodiment is partially different from that of the first embodiment, as described later. Other programs and data are identical to those of the first embodiment. Accordingly, the programs and data other than the sync-scanned flag 330 are denoted by the same reference numerals as those used for the first embodiment, and detailed descriptions thereof will be omitted.

The sync-scanned flag 330 is a flag for indicating whether or not synchronization of the TSF timers has been done by executing the aforementioned "synchronous scan". When the flag is set to OFF, it means that "synchronous scan" has never been executed. When the flag is set to ON, it means that "synchronous scan" has been performed and synchronization of the TSF timers has succeeded. In other words, this flag also indicates whether "synchronous scan" and "synchronization of TSF timers" are necessary or not.

In the present embodiment, an area for storing the sync-scanned flag 330 is allocated on the main memory 32 when the game application 1 is powered on, and this area is being held until the game apparatus 1 is powered off. That is, a period from when the game apparatus 1 is powered on to when the game apparatus 1 is powered off is adopted as an example of the period for holding the sync-scanned flag 330. However, the period for holding the sync-scanned flag 330 is not limited thereto, and it may be a period from when a specific game processing is started to when it is ended. That is, when a specific game processing is executed from an initial menu at the time of startup of the game apparatus 1, allocation and initial setting for the sync-scanned flag 330 are performed as part of initialization of the game processing, and when the game processing is ended, the sync-scanned flag 330 is erased from the main memory 32. When another game processing is started up, allocation and initial setting for the sync-scanned flag 330 may be performed again.

The following describes details of a connection-related process of the second embodiment. The connection-related process of the second embodiment is obtained by changing a part of the process of the flowchart shown in FIG. 10 described for the first embodiment, and the other part of the process is identical to that of the first embodiment. Note that partitioning and initial setting for the sync-scanned flag 330 are executed at the time of startup of the game apparatus 1.

Figure 14:
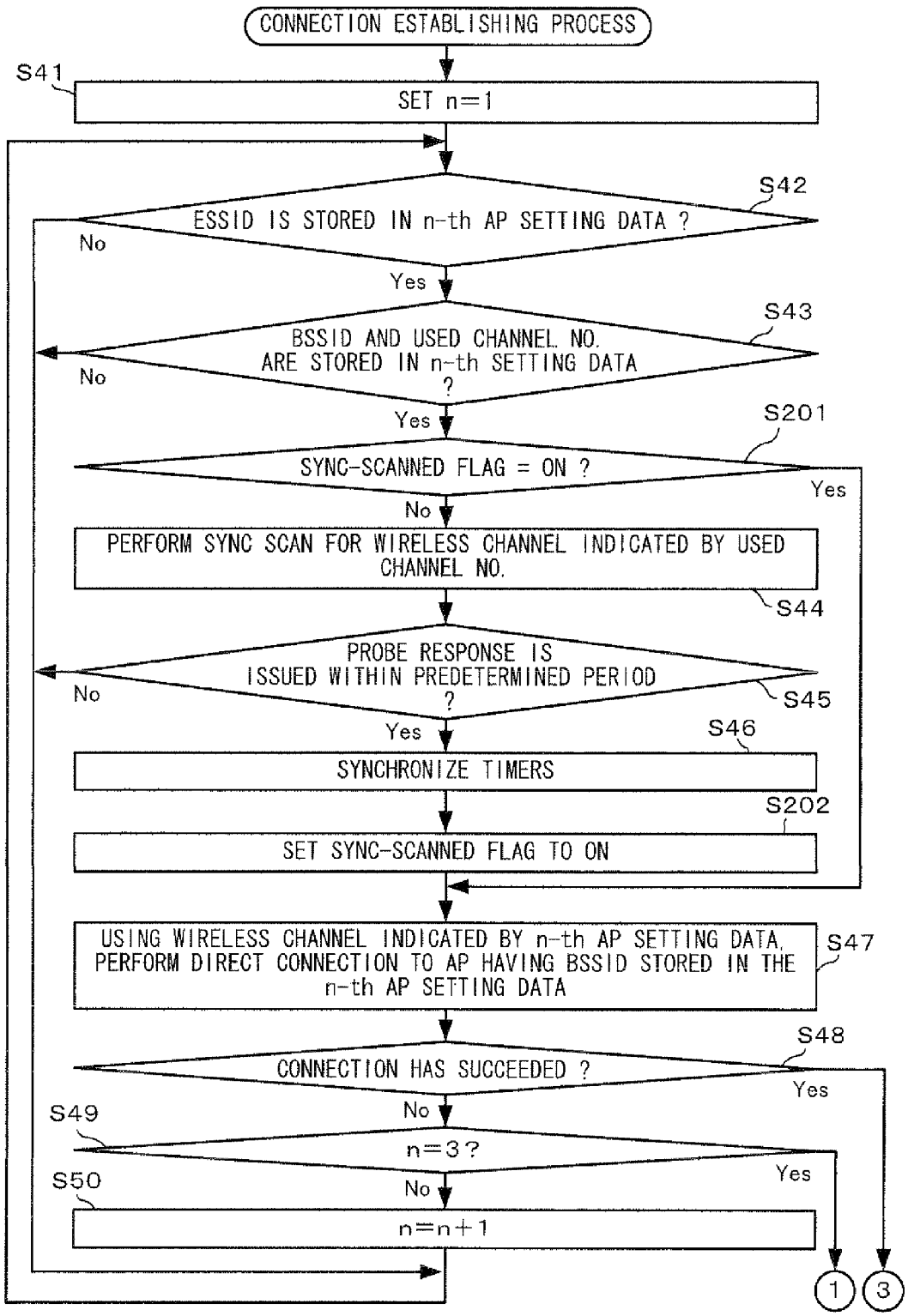
FIG. 14 is a flowchart illustrating apart of a connection establishing process of the second embodiment.

FIG. 14 is a flowchart illustrating a part of the connection establishing process of the second embodiment. In this flowchart, steps S41 to S43, S44 to S46, and S47 to S50 are identical to those of the flowchart shown in FIG. 10 for the first embodiment. In the flowcharts, the same steps are denoted by the same reference numerals. Hereinafter, processes in S201 and S202 relating to the second embodiment will be mainly described.

In FIG. 14, the process in step S43 (YES in step S43) is followed by step S201. In step S201, it is determined whether or not the sync-scanned flag 330 is set to ON. When the result of the determination indicates that the flag is set to OFF (NO in step S201), it means that "synchronous scan" has not been executed after the power-on of the game apparatus 1. Therefore, the processes in steps S44 to S46 are executed as described for the first embodiment to perform "synchronous scan" and "synchronization of the TSF timers". After the synchronization of the TSF timers is completed, the sync-scanned flag 330 is set to ON in step S202. Thereafter, the processes in steps S47 to S50 are executed as described for the first embodiment.

On the other hand, when the result of the determination in step S201 indicates that the sync-scanned flag 330 is set to ON (YES in step S201), it means that "synchronous scan" has been performed after the power-on of the game apparatus, and the TSF timers have already been synchronized. That is, at this time, it is not necessary to synchronize the TSF timers. Therefore, the processes in steps S44 to S46 and S202 are skipped, and the process goes to step S47. Thereafter, similar processes to those described for the first embodiment are basically executed. However, after the time synchronization is performed in step S581, the sync-scanned flag 330 is set to ON, followed by connection request to the AP 100 as described above.

As described above, in this second embodiment, "synchronous scan" is not performed every time the connection establishing process is executed. That is, during a predetermined period (e.g., a period between power-on and power-off of the game apparatus, or a period between startup and end of the game processing), if the TSF timers are synchronized by performing "synchronous scan", the process relating to "synchronous scan" is skipped thereafter until the end of this period. Thereby, the second and subsequent connection establishing processes performed during the predetermined period, the time required for connection establishment can be further reduced.

Embodiment 3

The following describes a game apparatus and a process thereof according to a third embodiment of the present invention. In the aforementioned second embodiment, whether "synchronous scan" is necessary or not is determined, for a predetermined period as a unit, using the sync-scanned flag 330. In contrast to the second embodiment, this third embodiment adopts a configuration capable of holding the values of the TSF timers by hardware, and thus the aforementioned process relating to "synchronous scan" is not required.

Figure 15:
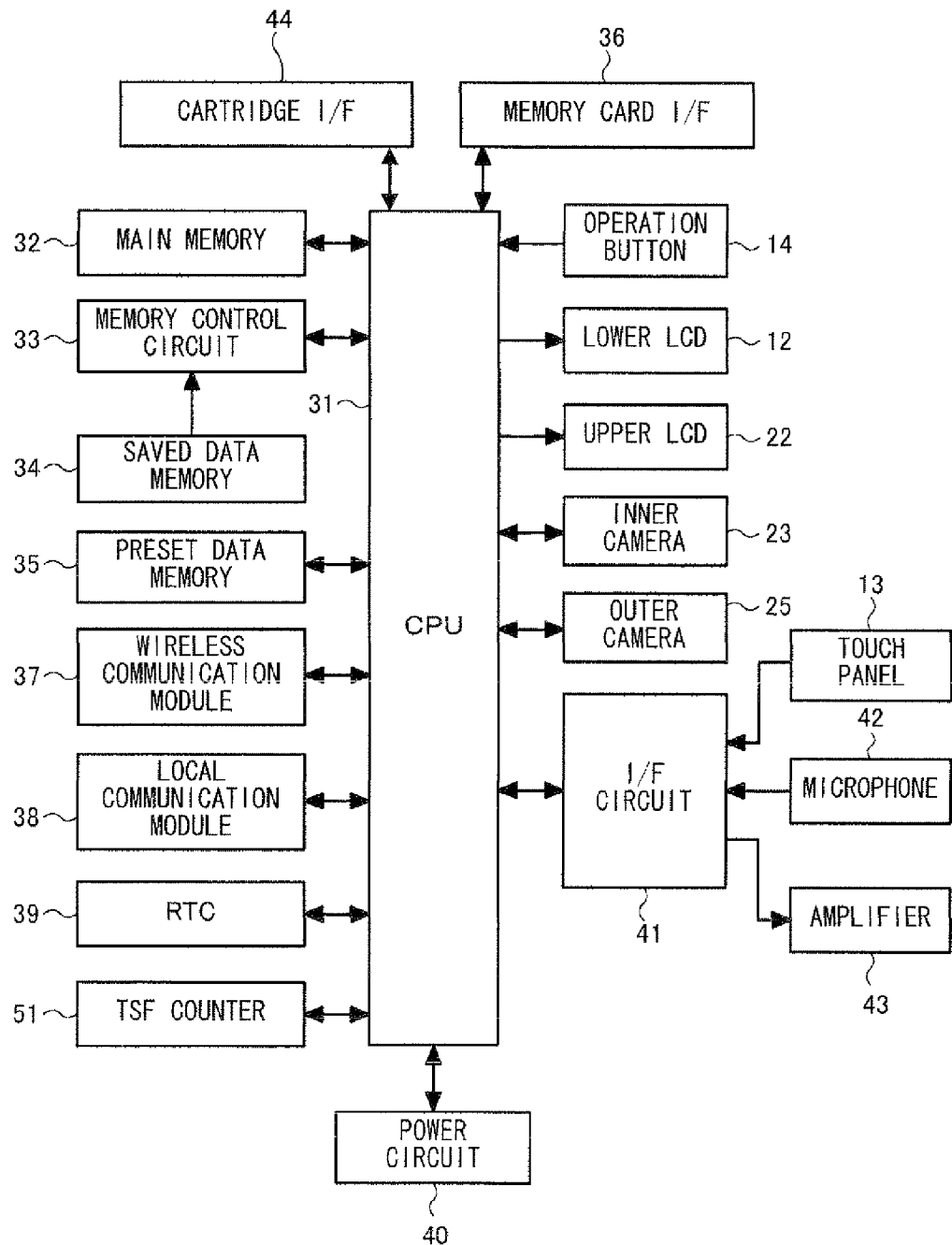
FIG. 15 is a block diagram illustrating an example of an internal structure of a game apparatus 1 of a third embodiment.

FIG. 15 is a block diagram illustrating an example of an internal structure of a game apparatus 1 according to the third embodiment. The game apparatus 1 of the third embodiment is obtained by adding a TSF counter 51 to the functional structure of the game apparatus 1 of the first embodiment described with reference to FIG. 3, and the components other than the TSF counter 51 are identical to those of the first embodiment. Therefore, the components other than the TSF counter 51 are denoted by the same reference numerals as those of the first embodiment, and detailed descriptions thereof are omitted.

The TSF counter 51 is a counter for holding the value of the TSF timer, and is made up of, for example, a chip for measuring time. Even when the TSF counter 51 is powered off, the TSF counter 51 can be operated by a power supplied from an internal battery. In this embodiment, when the three APs as described above are set as destinations, the value of the TSF timer targeted to the destination having the highest priority, e.g., the AP indicated as "destination 1" in FIG. 8, is held. Therefore, after synchronization of the TSF timers has been performed between the game apparatus 1 and the AP indicated as "destination 1", the TSF timer continues counting, and thereby the TSF timer of the game apparatus 1 can continue to hold the same value as the value of the TSF timer of the AP. The values of the TSF timers may be held also for the APs indicated as "destination 2" and "destination 3". In this case, a difference value between the value of the TSF timer obtained from the beacon of each AP and the value of the TSF counter 51 is stored for each AP. Synchronization is realized by calculating the values of the TSF timers, based on the difference value and the value of the TSF counter 51, for a connection process.

Figure 16:
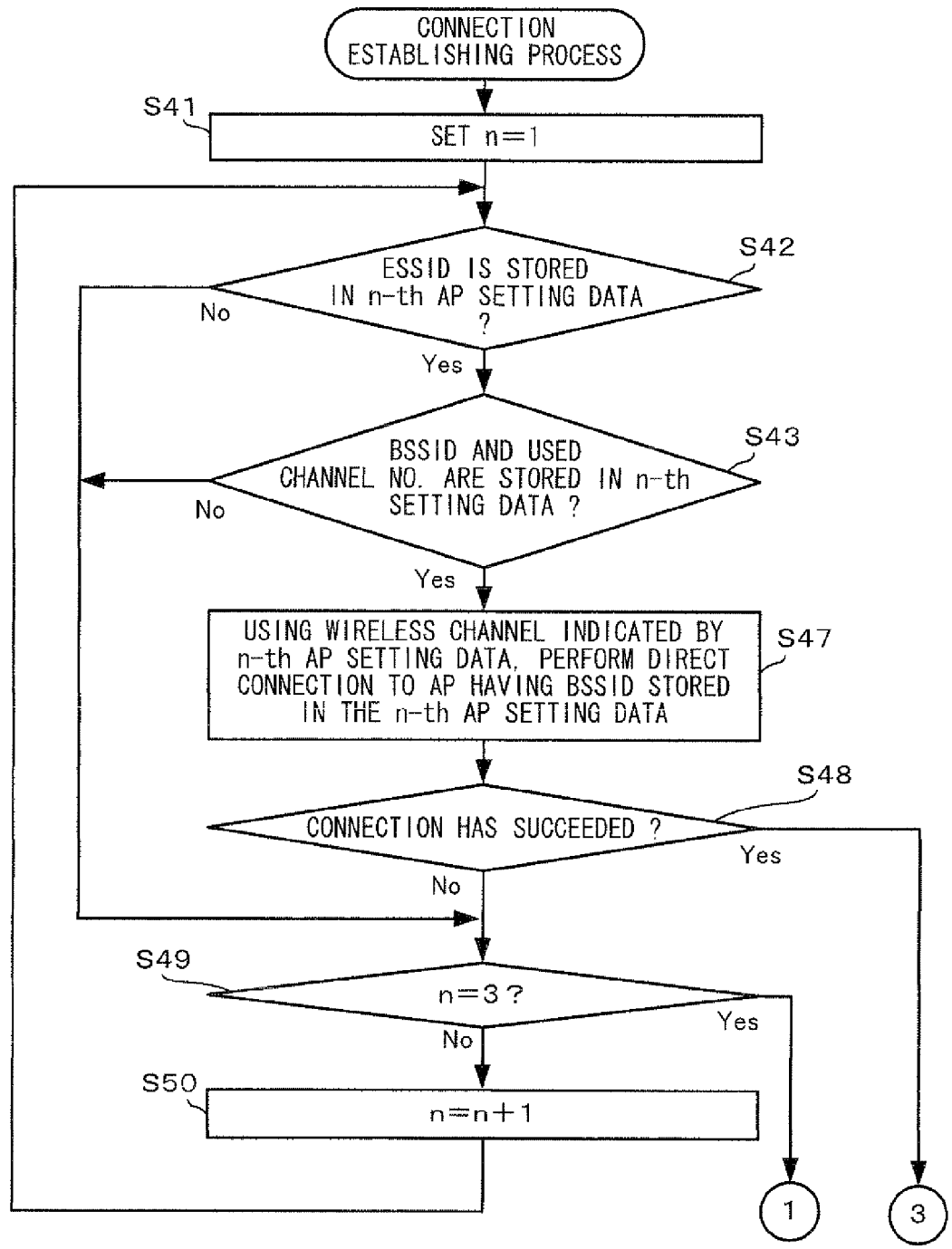
FIG. 16 is a flowchart illustrating a part of a connection establishing process of the third embodiment.

Next, the connection establishing process of the third embodiment will be described. In the third embodiment, by using the TSF counter 51, the process relating to the "synchronous scan" can be skipped. FIG. 16 is a flowchart showing a part of the connection establishing process of the third embodiment. This flowchart is obtained by removing the processes in steps S44 to S46 from the flowchart of the first embodiment shown in FIG. 10. That is, when the determination in step S43 in FIG. 16 is "YES", the process goes to step S47, and the value of the TSF counter 51 is obtained to adjust the timings of transmission and reception of the respective frames, followed by attempt of direct connection. Further, in the third embodiment, after the time synchronization is performed in step S581, a process of storing the value of the TSF timer included in the received beacon, into the TSF counter 51, is executed.

As described above, in the third embodiment, since the aforementioned TSF counter 51 is provided, the process relating to "synchronous scan" is not required. This configuration is particularly effective when applied to a communication terminal such as a stationary game apparatus, which can be continuously supplied with power (including a so-called power-saving mode).

In the above example, the TSF counter 51 as a chip for measuring time is provided separately from the RTC 39 which is also a chip for measuring time. However, the value of the TSF timer may be calculated using the value of the RTC 39. For example, the time at which the RTC 39 is synchronized with the AP is obtained from the RTC 39, and stored in the saved data memory 34 as "first sync time". When attempting next and subsequent connection establishments with this AP, first, the time at the attempt (current time) is obtained from the RTC 39. Then, a difference between the obtained time and the "first sync time" (i.e., time elapsed from the first sync time) is calculated, and the value of the TSF timer may be determined based on this difference value.

Embodiment 4

The following describes a game apparatus and a process thereof according to a fourth embodiment of the present invention. A network configuration of the fourth embodiment, a functional block diagram of a game apparatus thereof, and a block diagram showing a hardware configuration thereof are identical to those of the first embodiment (refer to FIGS. 1, 2, and 3). In the fourth embodiment, however, a program which is partially different from that of the first embodiment is stored in the main memory 32, and the CPU 31 executes the program to realize a function different from that of the first embodiment.

Hereinafter, the outline of the process according to the fourth embodiment will be described. In the first embodiment, "synchronous scan" is executed in every connection establishing process (refer to steps S44 to S46 in FIG. 10). In contrast to the first embodiment, in the fourth embodiment, the process relating to the "synchronous scan" and the process relating to the direct connection are interchanged in order, and the direct connection is attempted first. If the direct connection has failed, "synchronous scan" is performed to synchronize the TSF timers, followed by another attempt for direct connection.

A memory map according to the fourth embodiment is different from the memory map of the first embodiment described with reference to FIG. 5, in part of the process contents of the connection establishing process. Other programs and data are identical to those of the first embodiment.

Figure 17:
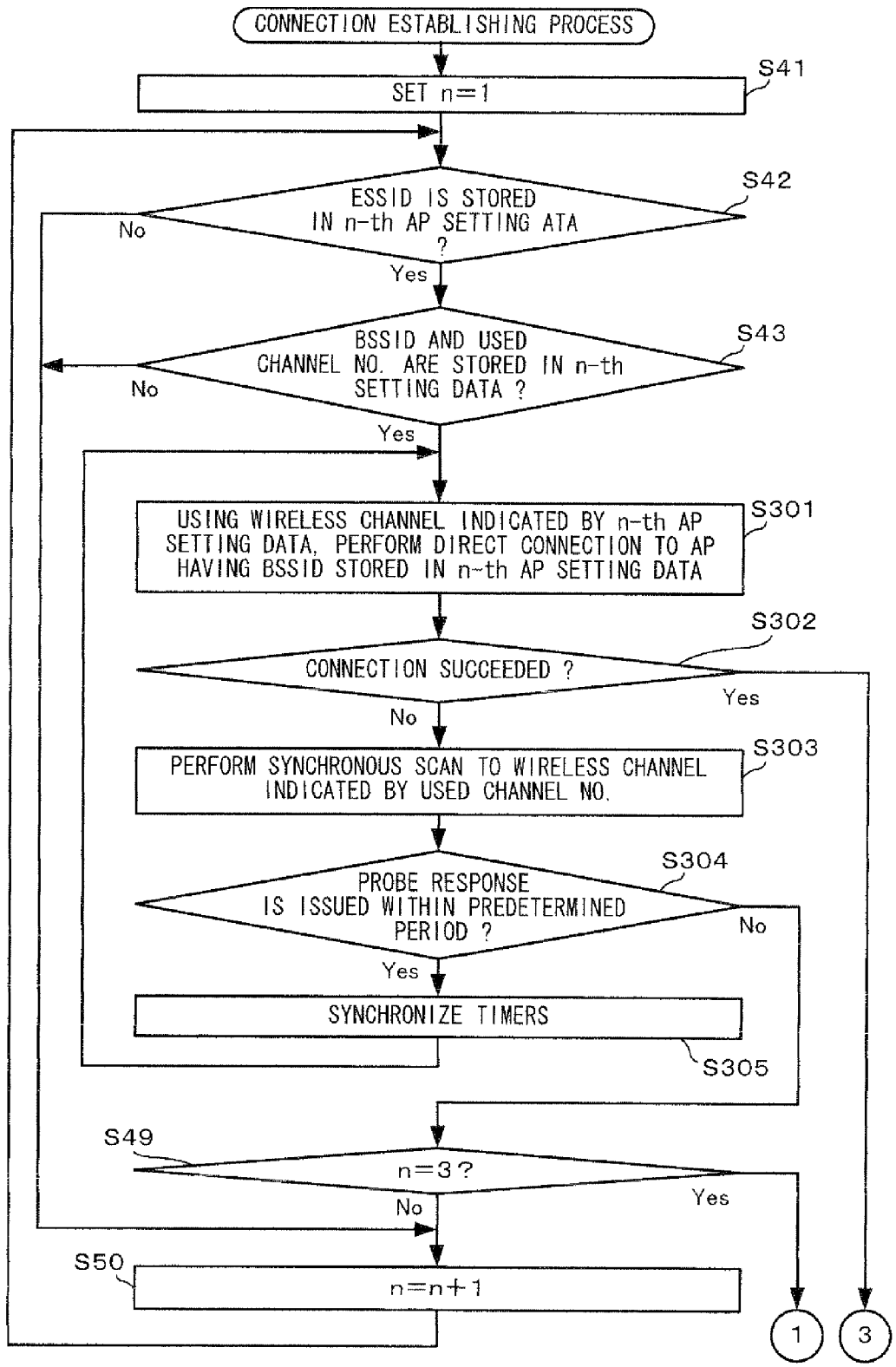
FIG. 17 is a flowchart illustrating apart of a connection establishing process of a fourth embodiment.

Next, the details of the connection-related process of the fourth embodiment will be described. The connection-related process of the fourth embodiment is obtained by changing part of the processes in the flowchart of the first embodiment described with reference to FIG. 10. More specifically, the order of the processes in steps S44 to S48 is changed. FIG. 17 is a flowchart showing apart of the connection establishing process of the fourth embodiment. In FIG. 17, the processes in steps S41 to S43 are identical to those of the first embodiment. In the fourth embodiment, step S43 is followed by step S301. In step S301, direct connection is attempted, with a wireless channel and a BSSID being specified. In the following step S302, it is determined whether or not connection has succeeded. When the result of the determination indicates that connection has succeeded (YES in step S302), the process goes to step S62. On the other hand, when it is determined that connection has failed (NO in step S302), the aforementioned process relating to "synchronous scan" is executed in this fourth embodiment. That is, in step S303, "synchronous scan" (transmission of a probe request frame) is executed, with a used channel being specified, and then it is determined in step S304 whether or not a probe response frame has been received within a predetermined time. When the result of the determination indicates that the probe response frame has been received within the predetermined time (YES in step S304), the TSF timers are synchronized in step S305, and thereafter, direct connection is again attempted in step S301. On the other hand, when it is determined that the probe response frame has not been received within the predetermined time (NO in step S304), the processes in steps S49 and S50 are executed as described for the first embodiment.

As described above, according to the fourth embodiment, direct connection is attempted first, and when this connection has failed (e.g., when synchronization has not been successfully made), the process relating to "synchronous scan" is performed, followed by another attempt for direct connection. Therefore, if an instruction to establish connection is again issued a short time after synchronization of the TSF timers has once been made, the process relating to "synchronous scan" can be skipped, and thereby the time required for connection establishment can be reduced.

While the invention has been described in detail, the foregoing description is in all aspects illustrative and not restrictive. It is understood that numerous other modifications and variations can be devised without departing from the scope of the invention.

What is claimed is:

1. A communication apparatus which performs wireless communication with a target apparatus, comprising:
    a first storage section;
    a first determination section for determining, when an instruction for connection establishment is issued, whether or not connection information is stored in the first storage section, the connection information including target apparatus specifying information that uniquely specifies a predetermined target apparatus; and a first connection section for performing, when the first determination section determines that the connection information is stored in the first storage section, a process for establishing a connection, by wireless communication, to the target apparatus that is specified based on the target apparatus specifying information stored in the first storage section.

2. The communication apparatus according to claim 1 further comprising:
a searching section for searching, when the instruction for connection establishment is issued, for a connectable target apparatus, and receiving a signal including the connection information;
a second connection section for performing a process for establishing a connection, by wireless communication, to the target apparatus searched for by the searching section, using the connection information included in the received signal; and
a connection information storage section for storing, when a connection has been established by the second connection section, the connection information used for the connection in the first storage section, wherein
when the instruction for connection establishment is issued, if a result of the determination by the first determination section indicates that the connection information is stored in the first storage section, the first connection section performs the connection establishing process, and if the result of the determination by the first determination section indicates that the connection information is not stored in the first storage section, the searching section and the second connection section perform the connection establishing process.

3. The communication apparatus according to claim 2 further comprising:
a connection result determination section for determining whether the first connection section has succeeded or failed in connection establishment, wherein
when the instruction for connection establishment is issued, the first connection section performs the connection establishing process, and if the connection result determination section determines that the first connection section has failed in connection establishment, then the searching section and the second connection section perform the connection establishing process; and
when the second connection section has succeeded in connection establishment which has been performed when the first connection section has failed in connection establishment, the connection information storage section stores the connection information used for the successful connection.

4. The communication apparatus according to claim 2, wherein
the connection information storage section continues to hold the connection information stored in the first storage section when the second connection section has succeeded in connection establishment, after the established connection was disconnected.

5. The communication apparatus according to claim 2, wherein
the searching section searches for a target apparatus by scanning an available frequency band.

6. The communication apparatus according to claim 1, wherein
the target apparatus specifying information is a BSSID (Basic Service Set Identifier).

7. The communication apparatus according to claim 1, wherein
the first storage section stores a plurality of pieces of connection information corresponding to a plurality of target apparatuses, respectively, and
the communication apparatus further comprises:
a connection result determination section for determining whether the first connection section has succeeded or failed in the connection establishment; and
a priority setting section for setting connection priorities to the plurality of target apparatuses, in association with the plurality of pieces of connection information, wherein
the first determination section determines whether or not connection information of a target apparatus having a highest connection priority is stored in the first storage section, and when it is determined that the connection information of a target apparatus having a highest connection priority is stored in the first storage section, the first connection section attempts to establish a connection to the target apparatus having the highest connection priority, and, wherein if the connection result determination section determines that the first connection section has failed in establishing a connection to the target apparatus having the highest connection priority, the first determination section determines whether or not connection information of a target apparatus having a second highest connection priority is stored in the first storage section.

8. The communication apparatus according to claim 1, wherein
the first storage section stores a plurality of pieces of connection information corresponding to a plurality of target apparatuses, respectively, and
the communication apparatus further comprises:
a priority setting section for setting connection priorities to the plurality of target apparatuses, in association with the plurality of pieces of connection information; wherein
the first determination section determines whether or not connection information of a target apparatus having a highest connection priority is stored in the first storage section, and when it is determined that the connection information of a target apparatus having a highest connection priority is not stored in the first storage section, the first determination section determines whether or not connection information of a target apparatus having a second highest connection priority is stored in the first storage section.

9. The communication apparatus according to claim 7, further comprising:
a priority order changing section for changing the order of the connection priorities given to the plurality of target apparatuses.

10. The communication apparatus according to claim 2, wherein
the first storage section stores a plurality of pieces of connection information corresponding to a plurality of target apparatuses, respectively, and
the communication apparatus further comprises:
a priority setting section for setting connection priorities to the plurality of target apparatuses, in association with the plurality of pieces of connection information; wherein
the first determination section determines whether or not connection information of a target apparatus having a highest priority is stored in the first storage section; and when the first determination section determines that the connection information of a target apparatus having a highest priority is not stored in the first storage section, the searching section searches for the target apparatus having the highest connection priority, and receives a signal including the connection information of the target apparatus having the highest priority; and the second connection section performs a process for establishing a connection to the target apparatus having the highest priority searched for by the searching section.

11. The communication apparatus according to claim 2, wherein the connection information storage section includes, in the connection information, frequency band information indicating a frequency band used when a connection is established by the second connection section, and stores the connection information in the first storage section; and the first connection section performs a process for establishing a connection to the target apparatus specified based on the target apparatus specifying information, by using the frequency band indicated by the stored frequency band information.

12. The communication apparatus according to claim 11, wherein the searching section receives a signal including at least the target apparatus specifying information and network identifying information which is identification information relating to a network to which the target apparatus belongs and is different from the target apparatus specifying information, and the communication apparatus further comprises:

a second storage section for storing the network identifying information; and a second determination section for determining whether or not the network identifying information included in the signal received by the searching section matches the network identifying information stored in the second storage section, wherein when a result of the determination by the second determination section indicates that the network identifying information included in the signal received by the searching section matches the network identifying information stored in the second storage section, the second connection section performs the connection establishing process with specifying the frequency band used when the searching section has received the signal, and specifying, as a destination of connection, the target apparatus indicated by the target apparatus specifying information included in the signal.

13. The communication apparatus according to claim 12, wherein the first storage section stores a plurality of pieces of connection information corresponding to a plurality of target apparatuses, respectively, and the communication apparatus further comprises:

a priority setting section for setting connection priorities to the plurality of target apparatuses, in association with the plurality of pieces of connection information, wherein the first determination section determines whether or not connection information of a target apparatus having a highest connection priority is stored in the first storage section;

when the first determination section determines that the connection information of the target apparatus having the highest connection priority is not stored in the first storage section, the searching section receives a signal which is periodically transmitted from the predetermined target apparatus and includes the network information and the target apparatus specifying information;

the second determination section determines whether or not the network identifying information included in the signal received by the searching section matches the network identifying information of the target apparatus having the highest connection priority, which is stored in the second storage section;

when the second determination section determines that the network identifying information included in the signal received by the searching section matches the network identifying information stored in the second storage section, the second connection section performs a connection establishing process in which the target apparatus indicated by the target apparatus specifying information included in the signal received by the searching section is specified as a destination of connection; and when the second connection section has established a connection, the connection information storage section stores, in the first storage section, the connection target specifying information included in the signal received by the searching section, and the frequency band information indicating the frequency band used for the connection, as the connection information relating to the target apparatus with which the connection has been established.

14. The communication apparatus according to claim 13, wherein when the second connection section has failed in connection establishment, the second determination section determines whether or not network identifying information corresponding to a target apparatus having a second highest priority, among the pieces of network identifying information stored in the second storage section, matches the network identifying information included in the received signal.

15. The communication apparatus according to claim 13, wherein when the second determination section determines that the network identifying information corresponding to the target apparatus having the highest priority, among the pieces of network identifying information stored in the second storage section, does not match the network identifying information included in the received signal, the second determination section determines whether or not network identifying information corresponding to a target apparatus having a second highest connection priority is included in the pieces of network identifying information stored in the second storage section.

16. The communication apparatus according to claim 1, wherein the connection information includes frequency band information indicating a frequency band used for performing wireless communication with the target apparatus, and the communication apparatus further comprises:

a synchronization section for searching for the target apparatus with specifying the frequency band indicated by the frequency band information stored in the first storage section, receiving a signal including information for time synchronization from the target apparatus, and performing time synchronization with the target apparatus, based on the information for time synchronization.

17. The communication apparatus according to claim 16, wherein
immediately before the first connection section starts to perform connection establishment, the synchronization section searches for the target apparatus with specifying the frequency band, and performs the time synchronization.

18. The communication apparatus according to claim 16 further comprising:
a third storage section for storing information indicating whether or not time synchronization has been performed by the synchronization section; and
a synchronization determination section for determining, before the first connection section starts to perform connection establishment, whether or not time synchronization has been performed, with reference to the information that is stored in the third storage section and indicates whether or not time synchronization has been performed, wherein
when the synchronization determination section determines that time synchronization has not yet been performed, the synchronization section searches for the target apparatus with specifying the frequency band, performs time synchronization, and stores information indicating that the time synchronization has been performed, in the third storage section.

19. The communication apparatus according to claim 16 further comprising:
a connection result determination section for determining whether the first connection section has succeeded or failed in connection establishment, wherein
when the connection result determination section determines that the first connection section has failed in connection establishment, the synchronization section searches for the target apparatus with specifying the frequency band, and performs time synchronization.

20. A non-transitory computer-readable storage medium having stored therein a communication control program to be executed by a computer of a communication apparatus which performs wireless communication with a target apparatus,
the communication control program causing the computer to perform functionality comprising:
a first determination section for determining, when an instruction for connection establishment is issued, whether or not connection information is stored in a first storage section as a predetermined storage medium, the connection information including target apparatus specifying information that uniquely specifies a predetermined target apparatus; and
a first connection section for performing, when the first determination section determines that the connection information is stored in the first storage section, a process for establishing a connection, by wireless communication, to the target apparatus that is specified based on the target apparatus specifying information stored in the first storage section.

21. A communication control method for controlling a communication apparatus which performs wireless communication with a target apparatus, the method comprising:
a step of determining, when an instruction for connection establishment is issued, whether or not connection information is stored in a first storage section as a predetermined storage medium, the connection information including target apparatus specifying information that uniquely specifies a predetermined target apparatus; and
a step of performing, when it is determined that the connection information is stored in the first storage section, a process for establishing a connection, by wireless communication, to the target apparatus that is specified based on the target apparatus specifying information stored in the first storage section.

22. A communication system having a communication apparatus and a target apparatus, the communication apparatus comprising:
a first storage section;
a first determination section for determining, when an instruction for establishing a connection with the target apparatus is issued, whether or not connection information is stored in the first storage section, the connection information including target apparatus specifying information that uniquely specifies the target apparatus; and
a first connection section for performing, when the first determination section determines that the connection information is stored in the first storage section, a process for establishing a connection, by wireless communication, to the target apparatus that is specified based on the target apparatus specifying information stored in the first storage section; and
the target apparatus having an information storage section in which the target apparatus specifying information is stored.

23. The communication apparatus according to claim 1, wherein the connection information includes the target apparatus specifying information that uniquely specifies the predetermined target apparatus by an address of the target apparatus and a frequency channel in which the apparatus wirelessly communicates.

* * * * *